US 7,167,483 B1
// Jan. 23, 2007

United States Patent
Sharma et al.

(10) Patent No.: US 7,167,483 B1
(45) Date of Patent: Jan. 23, 2007

(54) SYSTEM AND METHOD FOR MANAGING SUBRATE SERVICES IN AN OPTICAL NETWORK

(75) Inventors: Anirban Sharma, Raleigh, NC (US); James A. Steiner, Raleigh, NC (US); Patrick W. Poovey, Cary, NC (US)

(73) Assignee: CIENA Corporation, Linthicum, MD (US)

( * ) Notice: Subject to any disclaimer, the term of this patent is extended or adjusted under 35 U.S.C. 154(b) by 1002 days.

(21) Appl. No.: 10/152,139

(22) Filed: May 20, 2002

(51) Int. Cl.
 *H04B 7/212* (2006.01)
(52) U.S. Cl. .................... 370/442; 370/907
(58) Field of Classification Search ............ 370/223, 370/229, 326, 377, 410, 442, 389, 400, 907, 370/237, 347, 373, 294, 321
 See application file for complete search history.

(56) References Cited

U.S. PATENT DOCUMENTS 5,815,490 A * 9/1998 Lu ........................... 370/223
6,975,588 B1 * 12/2005 Katukam et al. ........... 370/222

\* cited by examiner

*Primary Examiner*—Chi Pham
*Assistant Examiner*—Alexander O. Boakye
(74) *Attorney, Agent, or Firm*—Clements Walker; Christopher L. Bernard; Tyler S. Brown

(57) ABSTRACT

A system and method of managing subrate paths in an optical network. An example embodiment is a network administration application or component. The application receives a description of a desired service for an optical network through a graphical interface. The application uses the information in the service request to identify and provision paths for the service through the nodes. The application may include varying degrees of interactivity and automation for selecting timeslot configurations and may support line and tributary protection schemes. The application may also support multiple provisioning strategies. Example system configurations, application components, graphical interfaces, and methods are provided.

36 Claims, 17 Drawing Sheets

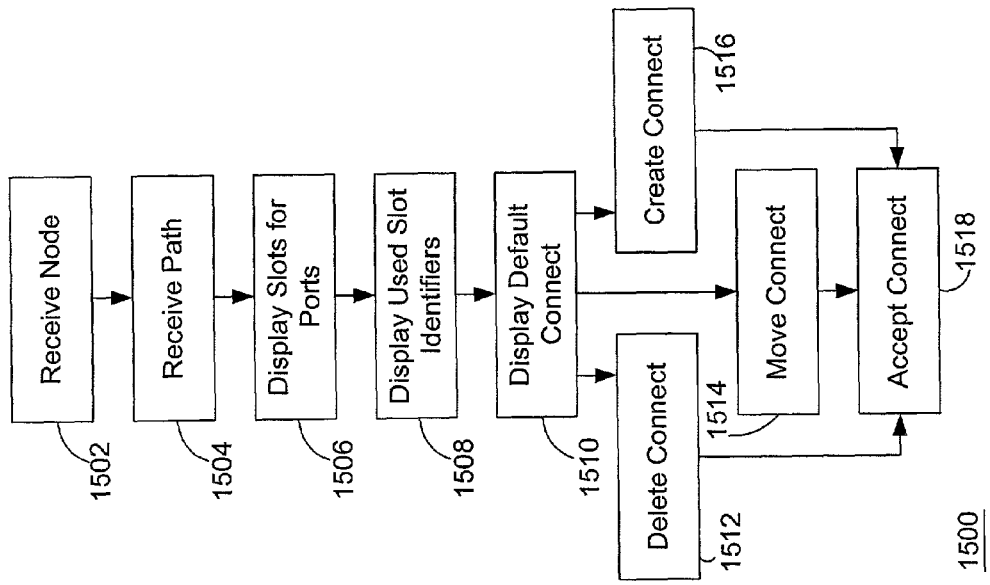
Figure 15
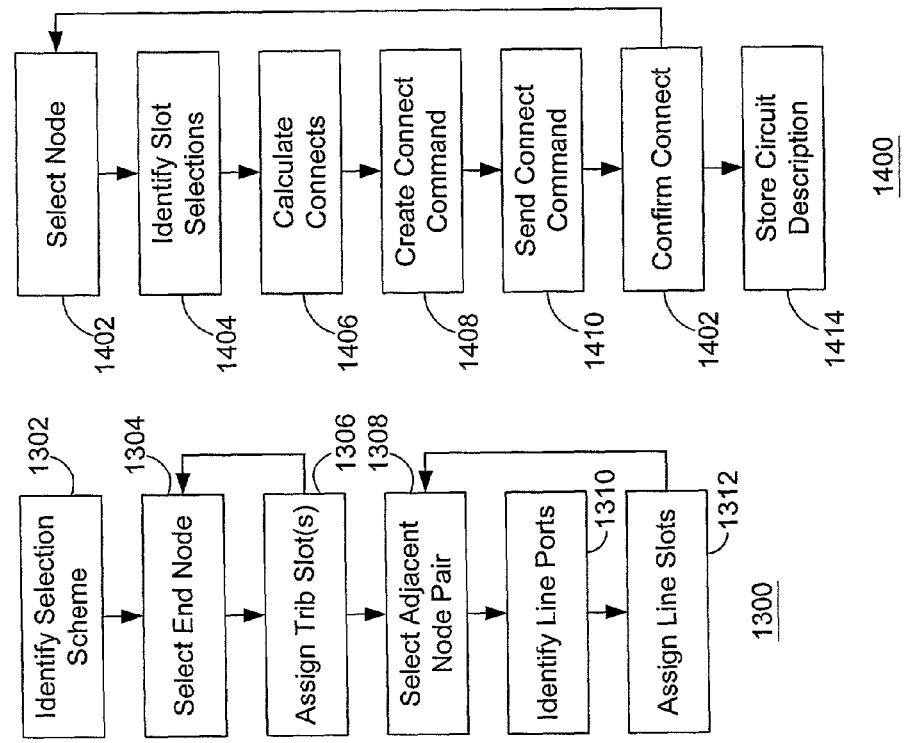
Figure 14
Figure 13

SYSTEM AND METHOD FOR MANAGING SUBRATE SERVICES IN AN OPTICAL NETWORK

BACKGROUND OF THE INVENTION

1. Field of the Invention

The invention relates to the field of communication networks and, more particularly, to the management of subrate paths in an optical network.

2. Description of the Related Art

The optical carriers in many optical communication networks have greater data transfer capabilities than one site or customer can reasonably use. For this reason, it is advantageous to be able to provision multiple paths through the same optical carrier. The provider of an optical communications network will frequently choose to employ some form of wavesharing in order to partition and sell lower capacity paths through the network. One method of wavesharing is time-division multiplexing using payload timeslots, such as the Synchronous Digital Hierarchy (SDH) or Synchronous Optical Networking (SONET) standards. The SONET standard defines a hierarchical method of byte-interleaved multiplexing. The hierarchy supports carriers handling varying capacities and defines overhead and payload bytes for network management and fault detection.

Under the SONET standard, data is transferred between nodes using a plurality of subrate timeslots. Generally, subrate add/drop multiplexors (ADMs) in the node elements of a given network will define the number and capacity of subrate timeslots available for paths between nodes. The underlying optical communications network defines the general topology and capacity in which the subrate network operates. The ADMs define the hierarchy of subrate capacities and the subrate topology overlaying the carriers in the optical communications network. The topology of the ADMs generally mimics the underlying network topology. If the underlying network topology is a ring of interconnected nodes, the subrate timeslots may follow a similar ring topology. However, some optical nodes may not be equipped with ADMs, and are therefore transparent to the subrate network. The capacity of underlying optical channel is divided into a number of subrate timeslots, as defined by the ADMs. The individual timeslots determines the minimum capacity subrate path available. For example, if the underlying capacity of the carrier is ~2,488 Mbps and the node elements support 48 subrate timeslots, each timeslot has a capacity of ~52 Mbps. Higher capacity paths are created by provisioning groups of the individual timeslots and aggregating their capacities. Note that a subrate path need not utilize the same timeslot through the entire network, but it must leave one node and be received by an adjacent node using the same timeslot. Provisioning subrate paths involves identifying the timeslots through which each ADM node in the path is receiving and sending data, and properly setting the cross-connects in each node to route the data between the identified timeslots.

Nodes in an optical communications network may typically be associated with an administrative complex. The administrative complex includes an administrative node processor module (ANPM) having a processor and a primary database. The administrative complex is concerned with control of administrative functions, examples of which include configuring and monitoring elements of a node and providing a management interface to a user. The administrative functions also include assigning timeslots within a node and establishing the appropriate cross-connects. A key part of monitoring the network includes the ability to determine the existing band, channel, and timeslot allocations in a network and the status of such bands, channels, and timeslots.

A network may comprise many nodes, and each of the nodes may have an associated administrative complex. Each of the administrative complexes is communicatively coupled to a network management application that is used by personnel at a network operations center (NOC) who are responsible for monitoring and managing the entire network. Typically, information such as the status of a particular channel, the nodes that a channel couples (or circuits that have been provisioned), operations that are performed at a node, alarm states, administrative states of circuits, as well as other detailed information about the network is provided by the administrative complexes to the NOC. Users at the NOC typically formulate requests for information, send those requests to the administrative complexes, and receive responses from the administrative complexes on an as needed basis. In a similar manner, such information can be gathered as the network is configured, periodically once the network is operational, and at times when there are failures in the network.

The provisioning of subrate paths includes identifying the node elements through which the path will go, identifying the available subrate timeslots for entering and leaving those node elements, and setting the proper cross-connects for directing data between receiving and sending timeslots within the node elements. In some node elements, such as ADMs, the timeslots include line timeslots for connections between adjacent node elements and tributary (or trib) timeslots for connections between node elements and destinations outside the network (e.g. a user site or another network). In some network configurations, the line timeslots include eastward timeslots for connecting to a node element's east neighbor and westward timeslots for connecting to a node element's west neighbor. Cross-connects may connect a trib timeslot to an eastward or westward line timeslot (add or drop), an eastward line timeslot to a westward line timeslot (pass through), or two trib timeslots to one another (hairpinning). A simple path will include a first end node with an add/drop configuration, a second end node with an add/drop configuration, and a number of intermediate nodes with pass through configurations.

In order to provision the cross-connects for a path in a SONET network, matching timeslots in adjacent nodes need to be identified. The fiber between node elements does not manipulate that data that passes through it. Data that is sent in a particular timeslot from one node will be received via the same timeslot at an adjacent node. Thus, adjacent nodes must have matching timeslots provisioned in order to correctly transfer data between them. For example, if node A is sending data out through its eastward timeslot 17, adjacent node B must have its westward timeslot 17 provisioned to receive the data. Because a SONET topology may have a variety of paths routed through it, with varying entry and exit nodes, not all node elements will include the same paths as their neighbors. As the number of provisioned paths in the network increases, identifying available channels and provisioning the corresponding timeslots may become increasingly difficult.

In most subrate networks, paths are bi-directional. A single provisioned timeslot represents a two-way circuit. Multiple timeslots may be provisioned to provide a higher capacity path. Additional paths may need to be provisioned depending upon any protection schemes that are in place for the service. For example, a service in a ring topology may use bi-directional protection, requiring circuits to be provisioned in both directions around the ring. Similarly, various forms of trib protection may influence the provisioning of a service. Consideration of protection schemes further increases the complexity of provisioning services in an optical communications network.

Prior methods of provisioning a service required a network administrator to gather and understand a great deal of information in order to provision a new service. First, the network administrator would receive an order for a new service for a particular customer. The new order would specify the sites to be connected, any trib and line protection being used, and the capacity desired. Based upon the identified sites, the network administrator would determine which nodes would be in the circuit. The nodes may also vary depending upon the type of line protection requested. The network administrator would then issue a query to each of the nodes to discover what timeslots were currently available in each. Once replies to the queries were received, the network administrator would evaluate the information and identify available paths for the service. The network administrator would then select paths based upon the desired capacity. Based on the selected paths, the network administrator would then issue an order to each of the nodes specifying the proper configuration of the cross-connects. In some networks, setting the cross-connects may need to be done on-site at the nodes, rather than through the network. Once the network administrator has received confirmation that the cross-connects are set, the circuits in the new service are tested. If testing is successful, the new service is turned over to the customer.

Unfortunately, the prior methods involve a great deal of time and effort by the network administrator. The administrative complexes provide timeslot discovery information and cross-connect confirmation in a piecemeal basis that makes it very difficult to get the correct information to configure the network. Moreover, it causes the NOC to issue repeated requests for the same information. Thus, there is a need for a method to provide information necessary for provisioning and maintenance of subrate services in a more readable and useful manner.

Therefore, it is desirable to have a system for displaying subrate path provisioning information to a user. It is also desirable to have a system that allows a user to easily provision and maintain subrate services. Some degree of automation for provisioning of the nodes for an identified subrate service is also desirable.

SUMMARY OF THE INVENTION

The embodiments of the invention described below provide improved management of subrate paths in an optical network. The embodiments allow the user to easily provision and maintain subrate services. The embodiments include graphical interfaces for interactively displaying provisioning information. The embodiments receive information describing a desired subrate service. For example, a service request may identify terminal nodes, the service capacity, and any line or tributary protection schemes for the service. The embodiments use the information provided in the service request to identify the nodes to be used in the desired service. Based upon the identified nodes and other information in the service request, the embodiments assist a user to correctly provision the paths for the service. The embodiments identify available timeslots in the nodes and enforce rules for correctly selecting compatible timeslots in adjacent nodes and meeting the requirements of any tributary connections. The embodiments may provide provisioning strategies that automatically select paths or may allow the user to manually allocate timeslots for the paths. Once a timeslot configuration for the service is selected, the embodiments provision the cross-connects in the nodes to enable the service. Some embodiments of the invention may include systems and methods for managing an optical network, graphical interfaces for managing an optical network, systems and methods for provisioning an optical network, and computer readable storage media.

BRIEF DESCRIPTION OF THE DRAWINGS

These and other features of the invention's embodiments are more fully described below. Reference is made throughout the description to the accompanying drawings, in which:

FIG. 13 is a flowchart of a method of determining a timeslot configuration in accordance with an embodiment of the invention.

FIG. 14 is a flowchart of a method of provisioning a subrate circuit in accordance with an embodiment of the invention.

FIG. 15 is a flowchart of a method of modifying a timeslot configuration in accordance with an embodiment of the invention.

DETAILED DESCRIPTION OF THE INVENTION

A. Introduction

Figure 1:
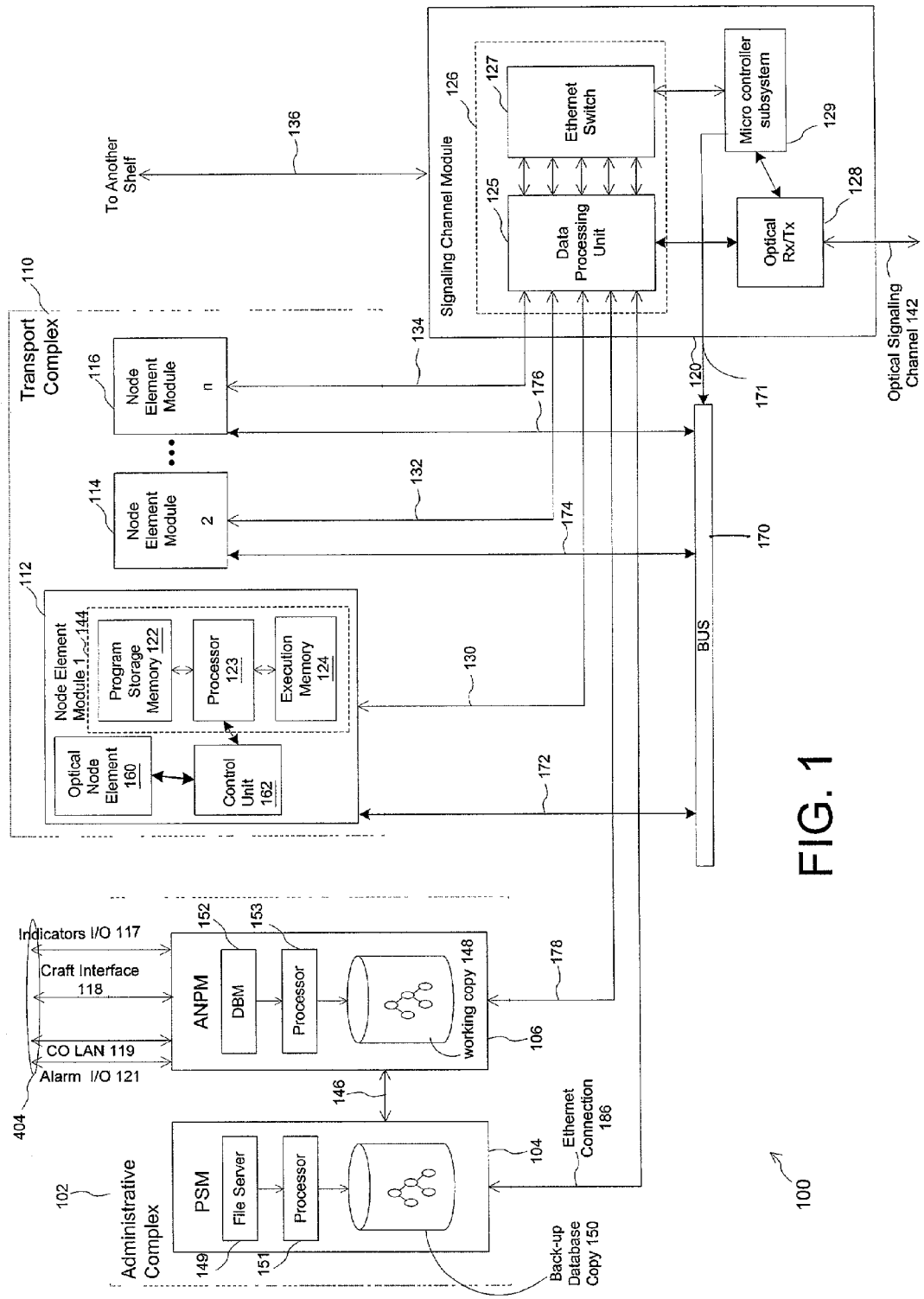
FIG. 1 illustrates an embodiment of a node in an optical communications network comprising an administrative complex and a transport complex.

Optical networks include nodes that process one or more optical wavelengths. An example of an optical network is a wavelength division multiplexed (WDM) optical network in which a plurality of wavelength channels are carried along an optical transmission medium. Each wavelength channel may carry other channels, each embodied as one or more time divisions of a time division multiplexed signal or one or more frequency divisions of a frequency division multiplexed signal. For example, an optical network may use bit-interleaved multiplexing to carry multiple channels by dividing the bit rate capacity into a pattern of time-based packets (e.g., SONET or SDH). An example of an optical transmission medium is an optical fiber. Those of skill in the art will appreciate that the invention may be embodied in various network topologies, examples of which are ring and mesh topologies. Examples of activities which processing at a node may comprise include routing and add/drop multiplexing. A node may process one or more wavelengths in the optical domain. For example, a node may comprise optical elements, such as optical filters, that pass through wavelengths that are not added or dropped at the node. A node may also perform optical-to-electrical and electrical-to-optical conversions as part of the processing of wavelengths. For example, when dropping a wavelength from the network to a tributary node, an optical-to-electrical conversion may be necessary because electrical equipment is only on the other side or is part of wavelength conversion to a wavelength that can be processed only by the tributary node.

Systems and methods for providing improved subrate path management is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an optical network. Such an optical network as claimed may be the entire network as detailed below in the preferred embodiment or only portions of such a network. For example, the present invention can operate with only the administrative complex of a node. Thus, the present invention is capable of operating with various portions of the network or node with minimal functionality similar to that functionality disclosed herein.

B. Anode

FIG. 1 shows an embodiment of a node 100 in an optical communication network. FIG. 1 illustrates an embodiment of a node 100 as a data and telecommunications transport platform. In this particular embodiment, the node 100 comprises an administrative complex 102, a transport complex 110 and a signaling channel module 120.

The transport complex 110 includes node element modules 112, 114, 116. The transport complex 110 is the collection of node elements 160 that carries the optical communications traffic. In other words, these are the modules 112, 114, 116 that process the "payload" data. For a transport complex 110 in a node 100 providing optical processing, the node elements 160 may comprise optical filters, switches, amplifiers, and attenuators. The transport complex 110 may also comprise one or more receivers or transmitters for access to the communication system for tributary signals.

Node element module 112 includes one or more optical node elements 160 and a control unit 162 including electrical hardware and software for controlling one or more of the node elements 160. In this embodiment, the node element modules 112 114, 116 share a common electronics architecture. This architecture comprises a microcontroller subsystem 144, including a processor 123, program storage memory 122, execution memory 124, an Ethernet connection 130, and a communication link 172 to an intra-nodal bus 170. In one embodiment, the intra-nodal bus 170 is a High-level Data Link Control (HDLC) bus. The microcontroller subsystem 144 may be augmented with additional I/O and control capabilities, as appropriate. A node element module 112 114, 116 may be embodied as a circuit pack.

In many systems today, node elements 160 are located on circuit packs, a certain number of which exist in a shelf unit. There may be one or more shelf units that comprise the hardware of the node. The number and arrangement of circuit packs in a shelf unit require planning to provide for, among other things, all necessary connections, heat dissipation, and power consumption. The circuit packs may be communicatively coupled to one another through a back plane.

The administrative complex 102 is primarily concerned with management of the node 100 and system related management functions. The administrative complex 102 typically has no payload traffic-affecting elements. The administrative complex 102 performs administrative node functions. Examples of administrative node functions are node configuration, provisioning, providing a management interface to the customer, retrieving and indicating failure conditions through alarms. In other words, the administrative complex 102 performs functions related to the operation, administration, maintenance, and provisioning (OAM&P) of the node 100. Another administrative function is interaction with external customer management systems to transmit the system's status and accept configuration commands. Other functions include reading external event inputs and signaling exception conditions on alarm outputs.

For example, the administrative complex 102 is responsible for storing the configuration information for the node element modules 112, 114, 116. Every node element module 112, 114, 116 at its initialization may upload its current configuration from the administrative complex 102. Examples of administrative information provided by the node element modules 112, 114, 116 to the administrative complex 102 are events such as state-changes. The administrative complex 102 accepts these events, and updates its own configuration.

The administrative complex 102 shown comprises two units: an administrative node processor module 106 having a working copy database 148 of administrative information for the node 100 and a persistent storage module 104 comprising a back-up copy 150 of the database stored in non-volatile memory.

A communication link 146 exists between the administrative node processor module 106 and the persistent storage module 104 for transfers of data. In this embodiment, the databases 148, 150 are object-oriented databases. The state of the node 100 may be represented as a run-time container of managed object instances. Changes to node operation are a result of the manipulation of the attributes of the managed objects. The working copy 148 of the administrative node processor module 106 is used during normal operations, and the backup copy 150 is maintained on the persistent storage module 104. The backup copy 150 is synchronized with the working copy 148 at all times and accessed in case the primary run-time database becomes corrupted or is deleted. For example if the administrative node processor module 106 is replaced, the backup database 150 on the persistent storage module 104 is copied onto the new administrative node processor module 106 when it is installed.

In the embodiment of FIG. 1, both the administrative node processor module 106 and the persistent storage module 104 comprise a processor, 151, 153, execution memory (not shown), for example, dynamic random access memory (DRAM) memory, program storage memory from which an operating system, for example Embedded NT, is downloaded. The processor 153 of the administrative node processor module 106 accesses the working copy 148 of the database and interacts with the persistent storage module 104 through the instructions of a database manager application 152 stored in program memory. The persistent storage module processor 151 executes a memory access application 149, such as a file server, to control access to the back-up database 150.

The example of the administrative node processor module 106 shown has additional features. For example, it has an input/output interface 119, for example an Ethernet interface, for communication to a central office local area network (CO LAN), which may include an element management system (EMS). The administrative node processor module 106 also shows a Craft Interface 118 such as a serial interface for a Craft RS-232C, or a Modem RS-232C. The administrative node processor module 106 also comprises an alarm input/output external interface 121 and another input/output interface 117 for other indicators to be sent to a craft interface terminal (CIT).

The processor module 106 also has an intra-nodal communication link 178, in this example an Ethernet connection, to the signaling channel module 120. The persistent storage module 104 also has an intra-nodal communication link 186, in this example an Ethernet connection, to the signaling channel module 120.

The signaling channel module 120 also comprises the central connection point for intra-node communication between node element modules 112, 114, 116, the administrative node processor module 106 and the persistent storage module 104. Additionally, the signaling channel module controls 120 the transfer of information, including administrative information at this node 100, between the illustrated node 100 and other nodes of the network over an optical signaling channel.

An optical signaling channel may be embodied in several different ways. For example, the channel may be embodied as one or more dedicated wavelengths carrying administrative information wherein the one or more dedicated wavelength is out-of-band, or separate from the payload wavelengths. The signaling channel may be embodied in one or more divisions of a time-division multiplexed signal. In another embodiment, the signaling channel is carried in-band and is modulated onto the payload signals.

In the embodiment shown, the signaling channel module 120 comprises a Data Interconnection Unit 126 comprising in this example, an Ethernet Switch 127 and a Data Processing Unit 125, an optical transceiver unit 128 comprising an optical transmitter, an optical receiver and related control logic, and a microcontroller subsystem 129. In this embodiment, the microcontroller subsystem 129 has the same architecture as the microcontroller subsystem 144 for a node element module 112. The microcontroller subsystem 129 also has a communication link 171 to the intra-nodal bus 170.

For incoming communications from other nodes, the optical receiver unit 128 converts the optical signaling channel into electrical form. The electrical signal is sent to the Data Interconnection Unit 126. The signal is then pre-processed by the data processing unit 125. For example, if the data carried on the optical signaling channel uses asynchronous transfer mode (ATM) packet format as its data transmission protocol, the data processing unit 125 comprises ATM physical circuitry to convert the data stream to Ethernet packets to allow transport by the Ethernet switch 127 to the appropriate node element module based on packet header information. Other data formats or transmission protocols may also be used.

Outgoing data to other nodes is formatted by the data processing unit 125 and routed through the Ethernet Switch 127 to the optical transceiver unit 128 where the data is modulated by a transmitter (e.g. a laser) onto the optical signaling channel.

In the embodiment of FIG. 1, different node element modules 112, 114, 116 communicate over an Ethernet network across a back plane. The Ethernet network forms the basis of the communication system for intra-nodal communication. In this embodiment, the central point for intra-nodal communication and an interface between communications with other nodes and the intra-nodal communication system is implemented as the Data Interconnection Unit 126 comprising in this example, the Ethernet Switch 127 and the Data Processing Unit 125

This connection point is implemented as an Ethernet switch, which allows full duplex communications to be routed from one switch port to another. Full-duplex operation allows each port on the switch to simultaneously transmit and receive packets, and the Ethernet switch architecture provides sufficient internal bandwidth to allow independent port-to-port communication to occur simultaneously.

The optical signaling channel travels a path including one or more optical transmission media between the nodes. The optical signaling channel may be embodied in several different ways. In one embodiment, the optical signaling channel is embodied as one or more dedicated wavelengths carrying administrative information wherein the one or more dedicated wavelengths travel on optical fiber coupling the nodes of the network. Each dedicated wavelength is de-multiplexed (not shown) and received by the optical receiver of the signaling channel module. In one example, the signaling channel is a wavelength channel outside of the band of wavelengths on which payload data communications are carried. For example in an optical dense wavelength division multiplexing (DWDM) system in which the payload communications are carried in wavelengths in a typical pass-band of approximately 1530 nm and 1560 nm, the optical signaling channel may be carried on a wavelength of 1510 nm. A wavelength of either 1310 nm or 1480 nm may also be used. In another example, the optical signaling channel may be a dedicated wavelength within the pass-band of the payload wavelengths.

In another embodiment, lower frequencies, for example microwave frequencies, can be superimposed on the optical payload wavelengths by sub-carrier multiplexing (SCM) techniques. The signaling channel may also be embodied in one or more divisions of a time-division multiplexed signal. For example, a bit-stream header may be added to the payload data when the payload data is generated for transmission. At a receiver that performs optical to electrical conversion of the payload data wavelength, the header is removed and its information is forwarded for processing to the signaling channel module.

C. A Network Or Sub-Network Of Nodes

Figure 2:
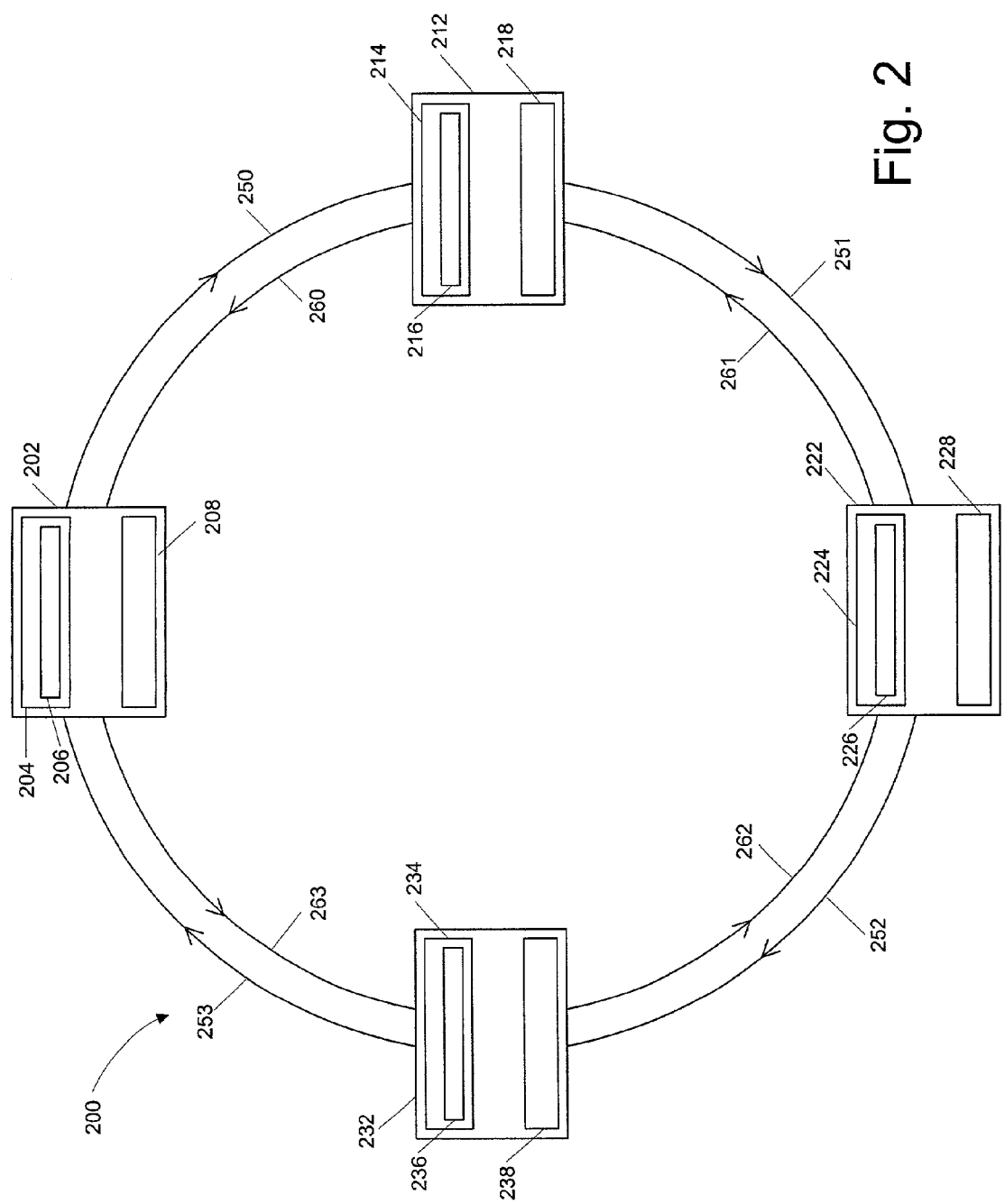
FIG. 2 illustrates an exemplary optical communications network having a plurality of nodes.

FIG. 2 illustrates an embodiment of an optical communications network or sub-network 200 having a plurality of nodes 202, 212, 222 and 232 is shown. Each node 202, 212, 222 and 232 is coupled to two other nodes 202, 212, 222 and 232 by pairs of optical fibers 250, 260, 251, 261, 252, 262, 253, 263 in a ring topology. Each node 202, 212, 222 and 232 comprises a signaling channel module 208, 218, 228 and 238 for controlling communication over and processing information carried by the optical signaling channel between the nodes 202, 212, 222 and 232. In this embodiment, an optical signaling channel travels on one or more optical fibers between a node 202, 212, 222 and 232 and another network node 202, 212, 222 and 232. In the embodiment of FIG. 2, each node 202, 212, 222 and 232 also includes a processor module 204, 214, 224, 234. Nodes 212 and 232 may each further comprise a persistent storage module (not shown). In one embodiment, the persistent storage module comprises non-volatile memory or dynamic random access memory (DRAM).

In the network shown, two neighboring nodes (e.g. 202 and 212) share a persistent storage module for storing a back-up database copy of administrative information for each of these nodes. In the embodiment shown, nodes 202 and 212 share a persistent storage module and nodes 222 and 232 share persistent storage module. A remote node 202, 222 sharing the persistent storage module uses the optical signaling channel to transfer information to and from persistent storage module. Alternatively, a remote node's associated persistent storage memory may be distributed in any other node. However, those skilled in the art will recognize that while there may or may not be a persistent storage module at a particular node, each node has an administrative complex 102.

Figure 3:
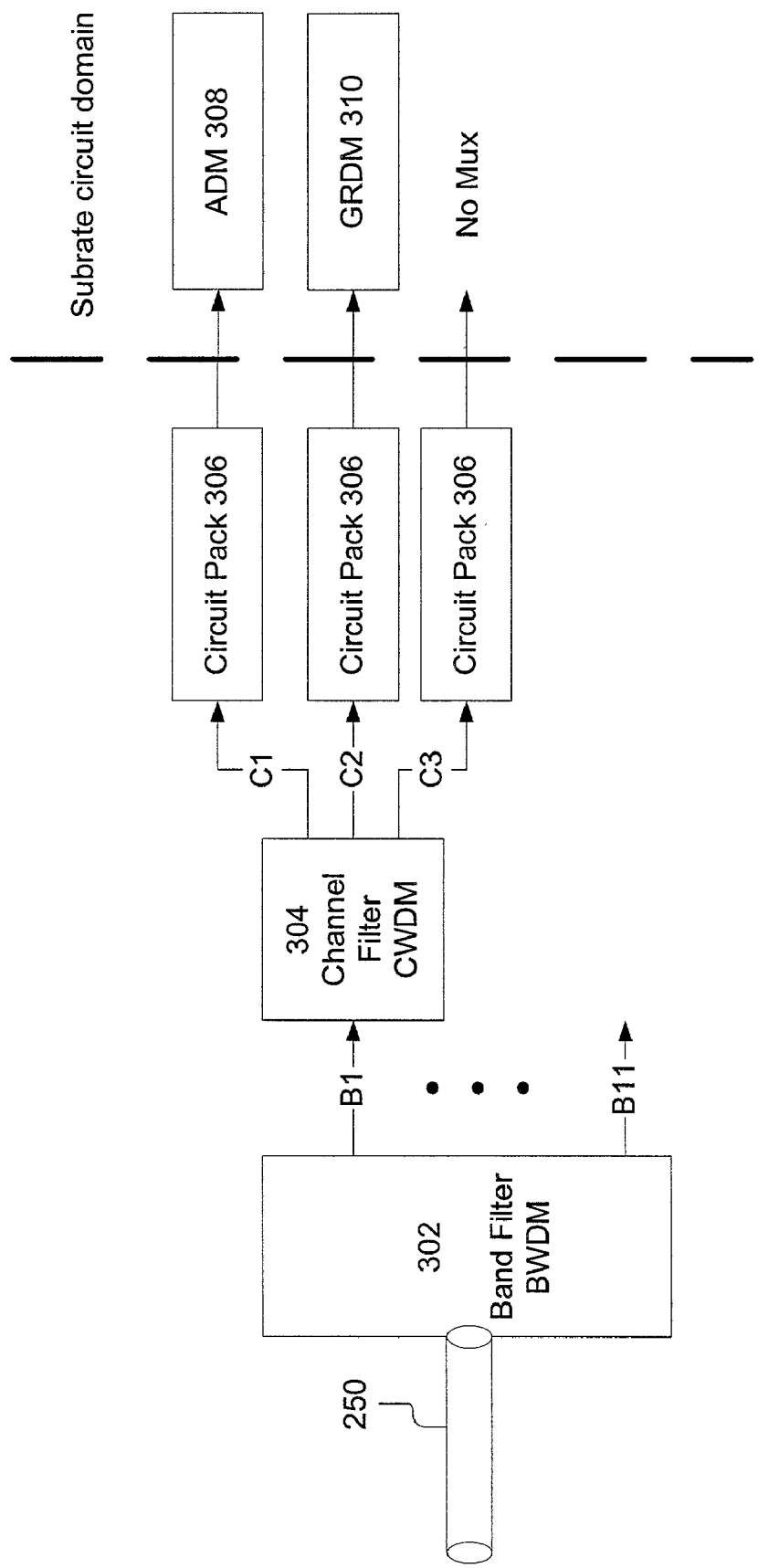
FIG. 3 illustrates a graphical representation of filtering that produces data for a particular channel, and the couplings of a channel to sources outside the network.

Referring now also to FIG. 3, a graphic representation of exemplary processing that is performed by the optical node elements 160 is shown. In an exemplary embodiment, each of the optical fibers 250, 260, 251, 261, 252, 262, 253, 263 carries a plurality of bands, each band having a plurality of channels. For example, there are preferably 33 wavelengths or channels of light carried on each of the optical fibers 250, 260, 251, 261, 252, 262, 253, 263, and these 33 channels are grouped in bands of 3 channels per band. Referring now particularly to FIG. 3, the processing of channels in a particular band are shown. At the node 100, the fiber 250 is coupled to a band filter 302 such as a band wavelength division multiplexer. The band filter 302 receives the input light from the fiber and generates a band of three channels at each output. The output of the band filter 302 is coupled to the input of a channel filter 304 such as a channel wavelength division multiplexer. The channel filter 304 has a plurality of outputs, for example 3, and separates the band of data into different channels, one at each output of the channel filter 304. Each output of the channel filter 304 is coupled to a respective circuit pack 306. As has been noted above, each circuit pack 306 can perform any number of optical processing such as routing and add/drop multiplexing. The circuit pack 306 can pass through wavelengths, regenerated channels, or optical-to-electrical and electrical-to-optical conversions for subrate circuits. The circuit pack 306 can be coupled as shown by way of example to a multiplexer (ADM) 308 or (GRDM) 310, or even no multiplexer. The existence of a multiplexer 308, 310 provides information to the system as to whether there may be subrate circuits coupled to the channel, and whether such subrate information may be accessible and presented for use in management and monitoring of the network. The configuration and management of paths using the subrate channels is further described below.

D. Element Management System (EMS)

Figure 4:
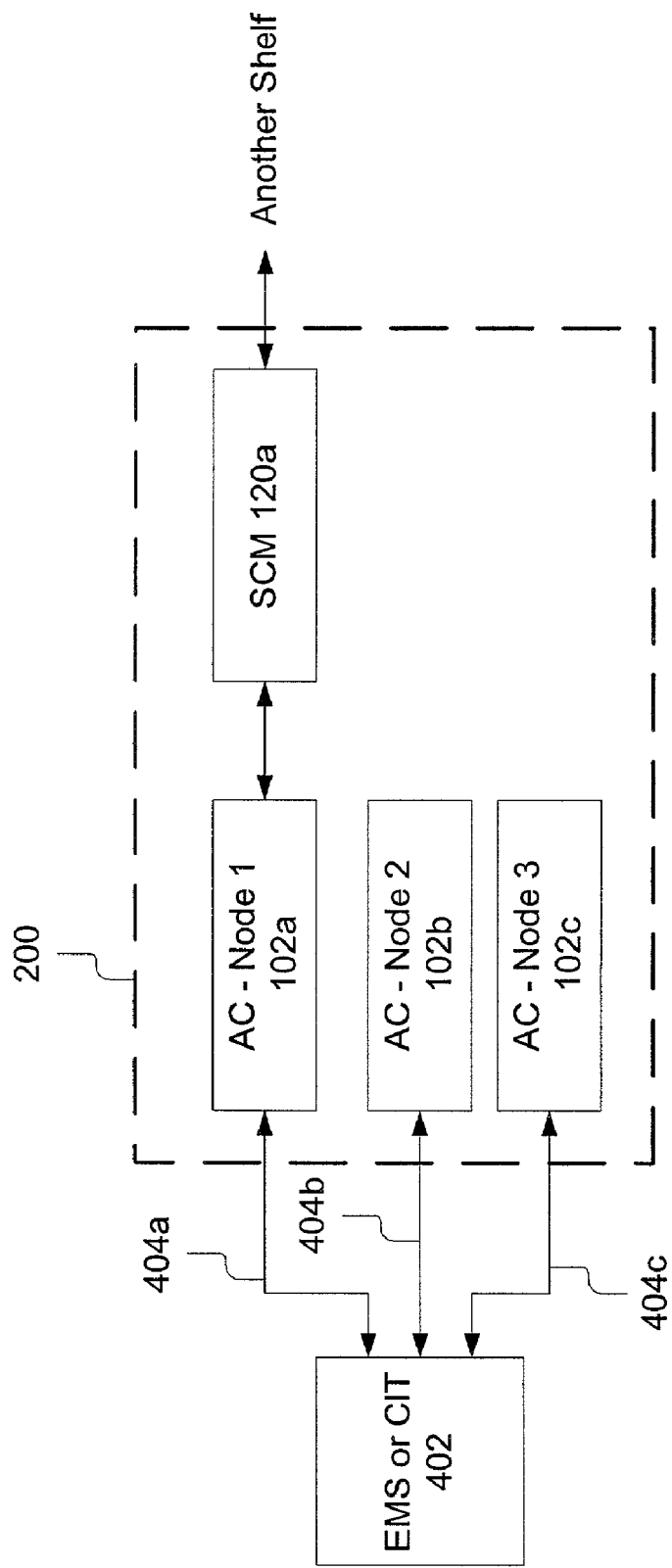
FIG. 4 illustrates a block diagram showing the coupling between the administrative complexes of nodes in a network and an element management system or craft interface terminal in accordance with the present invention.

Referring now to FIG. 4, the coupling of the nodes 100 of the network 200 to the element management system (EMS) 402 for administration and control of the network 200 is shown in more detail. The discussion below will focus on an element management system 402 that monitors and manages a sub-network or a plurality of sub-networks. Those skilled in the art will recognize that the description applies equally for a craft interface terminal (CIT), the primary difference being that a CIT can only be used to monitor a single sub-network whereas an element management system 402 can monitor multiple networks.

As shown in FIG. 4, the EMS 402 is coupled to the administrative complex 102a, 102b and 102c of each node 100 by respective signal lines 404a, 404b and 404c. These signal lines 404a, 404b and 404c have been described above with reference to FIG. 1, and preferably include 1) an input/output Ethernet interface 119 for communication to a central office local area network; 2) a craft interface 118 such as a serial interface for a craft RS-232C; 3) an alarm input/output external interface 121 and another input/output interface 117 for other indicators to be sent to the element management system 402. FIG. 4 also illustrates how the administrative complex 102a is coupled to the signal channel module 120a for communicating administrative information between the nodes 100 of the network 200 and other shelves that may contain other nodes. Using the couplings shown in FIG. 4, the element management system 402 can communicate with the administrative complex 102a, 102b, 102c of each node 100 to poll it for information regarding provisioning of band, channels, subrate information, circuit information and subrate circuit information. Those skilled in the art will recognize that such monitoring and management information is provided by some existing optical networks, but only in response to requests for such information by a system administrator via the element management system 402.

Figure 5:
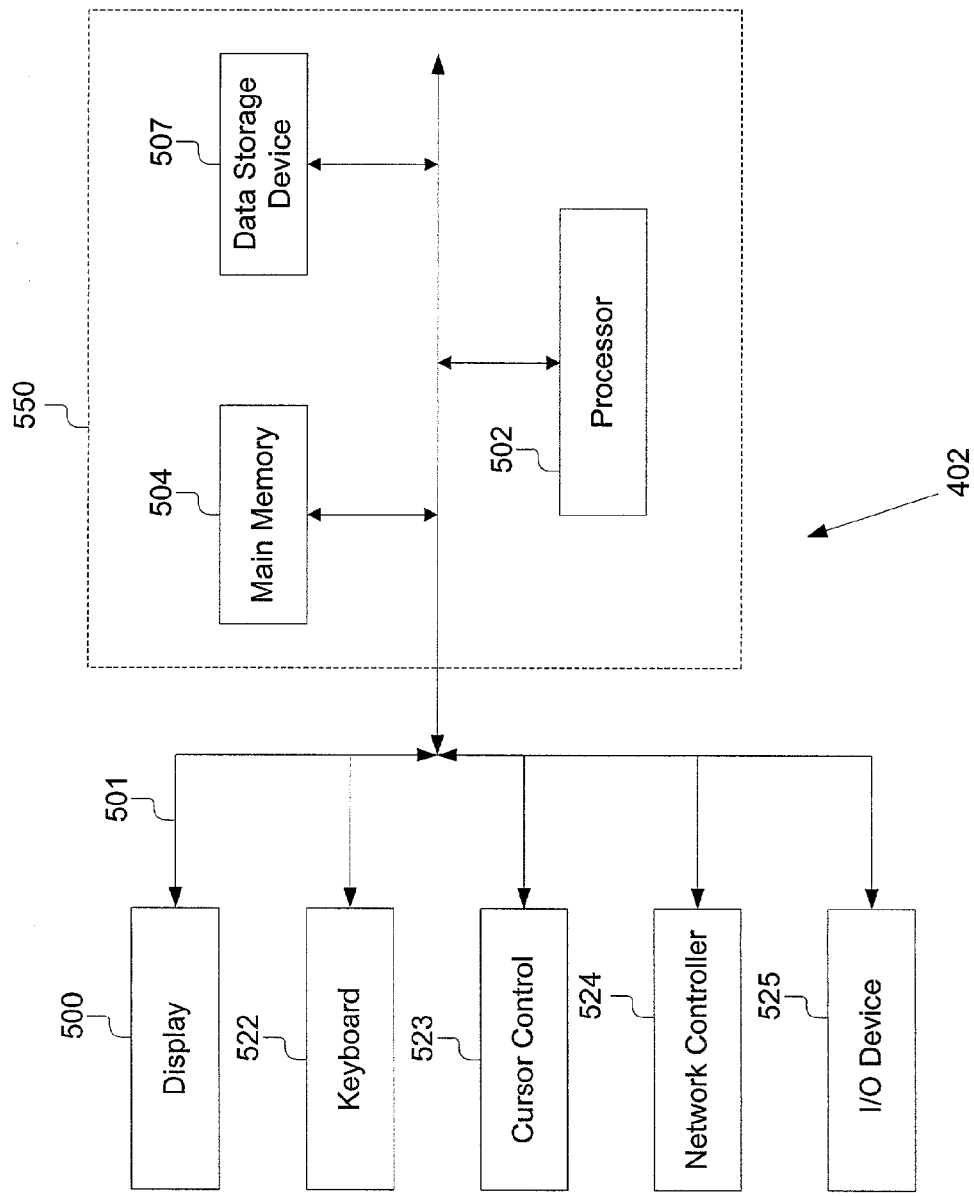
FIG. 5 illustrates a block diagram for a preferred embodiment of an element management system of the present invention.

Referring now also to FIG. 5, the element management system 402 is shown in more detail. FIG. 5 is a block diagram of one embodiment of the element management system 402. The element management system 402 includes a control unit 550. Control unit 550 may comprise an arithmetic logic unit, a microprocessor, a general purpose computer, or some other information appliance equipped to provide electronic display signals to display device 500. In one embodiment, control unit 550 comprises a general purpose computer having a graphical user interface, which may be generated by, for example, a program written in Java running on top of an operating system like WINDOWS® or UNIX® based operating systems. In one embodiment, the channel map and other user interfaces are generated by one or more application programs executed by control unit 550. In one embodiment, the operating system and/or one or more application programs executed by control unit 550 provide "drag-and-drop" functionality and tool tip functionality.

As shown in FIG. 5, the control unit 550 is shown including processor 502, main memory 504, and data storage device 507, all of which are communicatively coupled to system bus 501.

Processor 502 processes data signals and may comprise various computing architectures including a complex instruction set computer (CISC) architecture, a reduced instruction set computer (RISC) architecture, or an architecture implementing a combination of instruction sets. Although only a single processor is shown in FIG. 5, multiple processors may be included.

Main memory 504 may store instructions and/or data that may be executed by processor 502. The instructions and/or data may comprise code for performing any and/or all of the techniques described herein. Main memory 504 may be a dynamic random access memory (DRAM) device, a static random access memory (SRAM) device, or some other memory device known in the art. The memory 504 is described in more detail below with reference to FIG. 6. In particular, the portions of the memory 504 for generating and displaying the subrate service management interface are shown in detail.

Data storage device 507 stores data and instructions for processor 502 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 501 represents a shared bus for communicating information and data throughout control unit 550. System bus 501 may represent one or more buses including an industry standard architecture (ISA) bus, a peripheral component interconnect (PCI) bus, a universal serial bus (USB), or some other bus known in the art to provide similar functionality.

Additional components coupled to control unit 550 through system bus 501 include display device 500, a keyboard 522, a cursor control device 523, a network controller 524 and an I/O device 525. Display device 500 represents any device equipped to display electronic images and data as described herein. Display device 500 may be a cathode ray tube (CRT), liquid crystal display (LCD), or any other similarly equipped display device, screen, or monitor. Keyboard 522 represents an alphanumeric input device coupled to control unit 550 to communicate information and command selections to processor 502. Cursor control 523 represents a user input device equipped to communicate positional data as well as command selections to processor 502. Cursor control 523 may include a mouse, a trackball, a stylus, a pen, a touch screen, cursor direction keys, or other mechanisms to cause movement of a cursor. Network controller 524 links control unit 550 to a network that may include multiple processing systems and particular elements of the node 100. The network of processing systems may comprise a local area network (LAN), a wide area network (WAN) (e.g., the Internet), and/or any other interconnected data path across which multiple devices may communicate.

One or more I/O devices 525 are coupled to the system bus 501. For example, the I/O device 525 may be an audio device 525 equipped to receive audio input and transmit audio output. Audio input may be received through various devices including a microphone within I/O device 525 and network controller 524.

It should be apparent to one skilled in the art that control unit 550 may include more or less components than those shown in FIG. 5 without departing from the spirit and scope of the present invention. For example, control unit 550 may include additional memory, such as, for example, a first or second level cache, or one or more application specific integrated circuits (ASICs). Similarly, additional components may be coupled to control unit 550 including, for example, image scanning devices, digital still or video cameras, or other devices that may or may not be equipped to capture and/or download electronic data to control unit 550.

Figure 6:
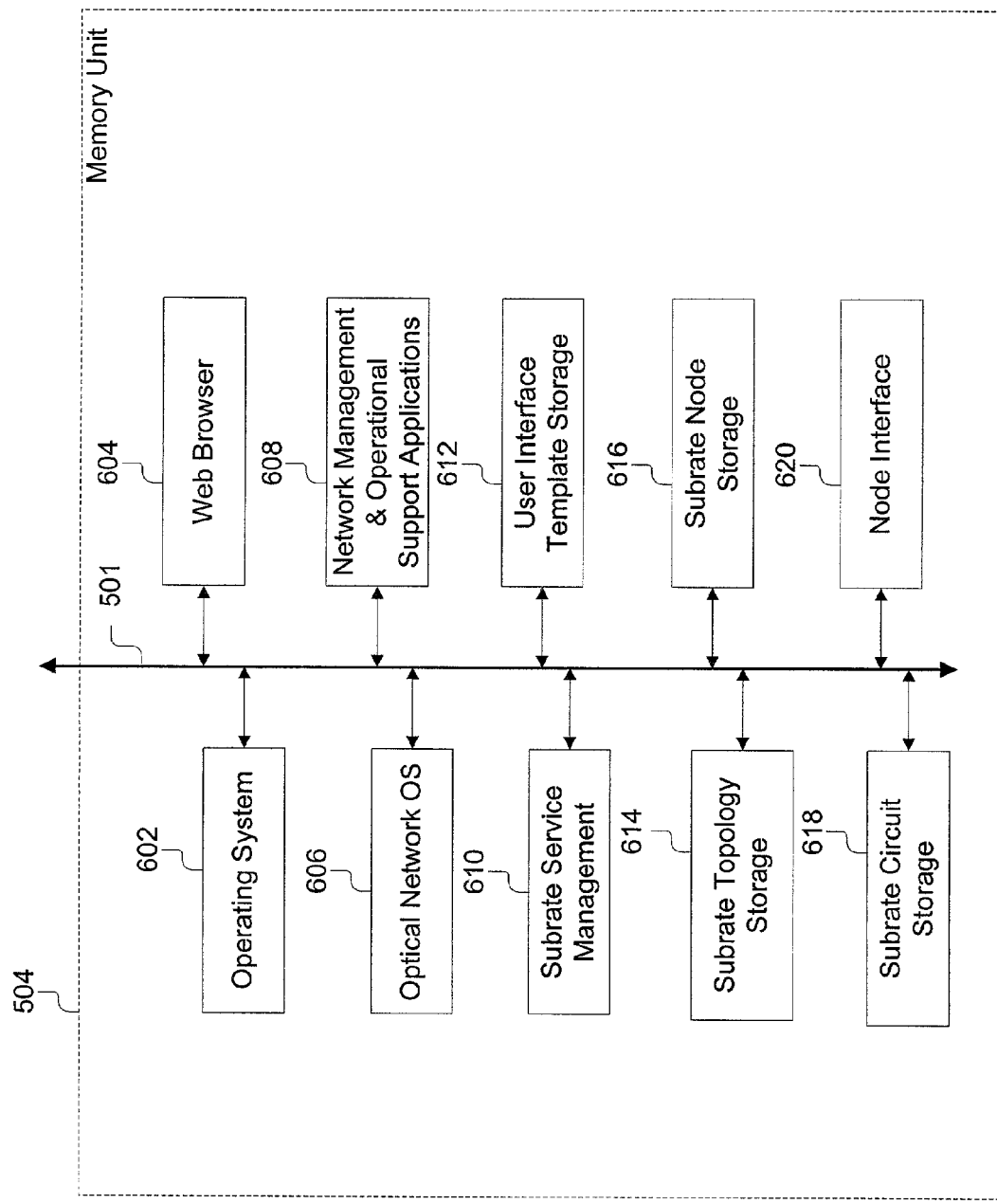
FIG. 6 illustrates a block diagram of the memory of the element management system of FIG. 5.

Referring now to FIG. 6, the memory 504 of the element management system 402 is shown in more detail. The memory 504 preferably comprises an operating system 602, a web browser 604, a optical network operating system 606, a network management and operational support applications 608, a subrate service management module 610, a storage of user interface templates 612, a subrate topology storage module 614, a subrate node storage 616, subrate circuit storage 618, and a node interface module 620. As noted above, the memory unit 504 stores instructions and/or data that may be executed by processing unit 502. The instructions and/or data may comprise code for performing any and/or all of the techniques described herein. These modules 602–620 are coupled by bus 501 to the processing unit 502 for communication and cooperation to provide the element management system 402 with the ability to generate and display a subrate service management interface. Those skilled in the art will recognized that while the present invention will now be described as modules or portions of a memory 504 of an element management system 402, the modules or portions may also be stored in other media such as permanent data storage and may be distributed across a network having a plurality of different computers such as in a client/server environment.

The operating system 602 is preferably one of a conventional type such as, for example, WINDOWS®, UNIX®, or LINUX® based operating systems. Although not shown, the memory unit 504 may also include one or more application programs including, without limitation, word processing applications, electronic mail applications, spreadsheet applications, and web browser applications.

It is well understood by those skilled in the art that multiple computers can be used in the place of a single computer by applying the appropriate software, hardware, and communication protocols. For instance, data used by a computer often resides on a hard disk or other storage device that is located somewhere on the network to which the computer is connected and not within the computer enclosure itself. That data can be accessed using NFS, FTP, HTTP or one of many other remote file access protocols. Additionally, remote procedure calls (RPC) can execute software on remote processors not part of the local computer. In some cases, this remote data or remote procedure operation is transparent to the user of the computer and to even to the application itself because the remote operation is executed through the underlying operating system as if it were a local operation.

The web browser 604 is of a conventional type that provides access to the Internet and processes HTML, XML or other mark up language to generated images on the display device 500. For example, the web browser 604 could be Netscape Navigator or Microsoft Internet Explorer.

The optical network operating system 606 provides control of the optical layer. The optical network operating system 606 is a program for performing the low level tasks necessary to control, monitor and maintain the optical layer of the network. This may be a conventional optical network operating system such as that provided as a portion of the OPTX™ Software Suite manufactured and sold by ONI Systems Corp. of San Jose, Calif. The optical network operating system 606 includes functionality such as embedded subnetwork level control and management, optical power balancing, automated protection switching management, and administration of software provisionable, rate-tunable services.

The network management and operational support applications 608 are programs that run optical network operating system 606. The network management and operational support applications 608 provide a variety of tools for designing, maintaining and managing an optical network. These applications may be a conventional type such as that provided as a part of the OPTX™ Software Suite manufactured and sold by ONI Systems Corp. of San Jose, Calif.

The subrate service management module 610 is a system for managing subrate services through a graphical user interface. The subrate service management module 610 oversees receipt of a service description, discovery of available subrate paths, and provisioning of selected subrate circuits fulfilling the service. In one embodiment, the subrate service management module 610 coordinates the functions of several other components in order to carry out its functions. The interactions of the subrate service management module 610 and these other component is described below with regard to FIG. 8. Example processes that are implemented in some embodiments of the subrate service management module 610 are described with regard to FIGS. 9–14. The subrate service management module 610 is coupled to the bus 501 for communication with the network management and operational support applications 608, the storage of user interface templates 612, the subrate topology storage module 614, the subrate node storage 616, the subrate circuit storage 618, and the node interface module 620. In one embodiment, the subrate service management module 610 is an optional component of the network management and operational support applications 608. The subrate service management module 610 shares interface paradigms and common resources, such as the storage of user interface templates 612, the subrate topology storage module 614, the subrate node storage 616, the subrate circuit storage 618, the node interface module 620, and components of the network management and operational support applications 608, with the network management and operational support applications 608.

The storage of user interface templates 612 is used to store the user interface templates that are combined with data from the subrate topology storage module 614, the subrate node storage 616, the subrate circuit storage 618, and user input to provide a graphical user interface for the functions of the subrate service management module 610. The present invention advantageously includes a plurality of different templates for displaying different interfaces for creating and managing the subrate services. For example, a series of templates provide a wizard for selecting and provisioning a subrate service. Some example templates are described below with reference to FIGS. 15–19.

The subrate topology storage 614 is used to store data related to one or more subrate network topologies associated with an optical network. In one embodiment, the subrate topology storage 614 includes managed objects for modeling subrate network overlays on the optical network. For example, the managed objects may include a topology type (e.g., ring, cluster, or line), a listing of nodes with subrate ADMs, and the relative positions of those ADMs. The data in the subrate topology storage 614 is retrieved from the administrative complexes 102 of the nodes 100 and may be supplemented by information from other sources, such as network management and operational support applications 608 and subrate service management module 610. The subrate service management module 610 uses the information in the subrate topology storage 614 to identify the nodes in the path of a selected service.

The subrate node storage 616 is used to store data related to the timeslot and cross-connect configurations within nodes in the subrate network. In one embodiment, the subrate node storage 616 includes managed objects for modeling node configurations within the subrate network. For example, the subrate node storage 616 may include a node object for each node in the subrate network, where each node object includes the number of existing, used, and/or available ports, trib timeslots, and line timeslots for the corresponding node. The data in the subrate node storage 616 is retrieved from the administrative complexes 102 of the nodes 100 and may be supplemented by information from other sources, such as network management and operational support applications 608 and subrate service management module 610. The subrate service management module 610 uses the information in the subrate node storage 616 to identify available timeslots in the nodes for locating and provisioning a selected service.

The subrate circuit storage 618 is used to store data related to individual circuits within the subrate network. In one embodiment, the subrate circuit storage 618 includes managed objects for modeling each service in the subrate network. For example, the subrate circuit storage 618 may include a circuit object for each provisioned service in the subrate network, where each circuit object identifies the nodes, timeslots, and ports through which the circuit passes. The data in the subrate circuit storage 618 is generated by the subrate service management module 610 during circuit provisioning and based upon information retrieved from the administrative complexes 102 of the nodes 100. The subrate service management module 610 uses information in the subrate circuit storage 618 to display, manage, and modify existing services.

The node interface 620 is a set of protocols for transferring information between the administrative complexes 102 of the nodes 100 and the subrate service manager 610, the network management and operational support applications, and other resources. With reference to the subrate service manager 610, the node interface 620 provides a messaging standard for communicating queries and commands to administrative complexes associated with ADM nodes. Specifically, the node interface 620 allows the subrate service manager 610 to send commands for establishing cross-connects within the ADM nodes of the subrate network. For example, once the subrate service manager 610 has determined the path of a desired circuit and the port and cross-connect configuration for implementing that circuit, the subrate service manager 610 issues the command for the appropriate cross-connect configuration to the administrative complex of each of the affected nodes through the node interface 620. The node interface 620 also allows information from the administrative complexes to be queried and stored within the various storage, such as the subrate node storage 616. In some embodiments, the node interface 620 may be an integrated component of the subrate process management module 610 or the network and operational support applications 608.

Figure 7:
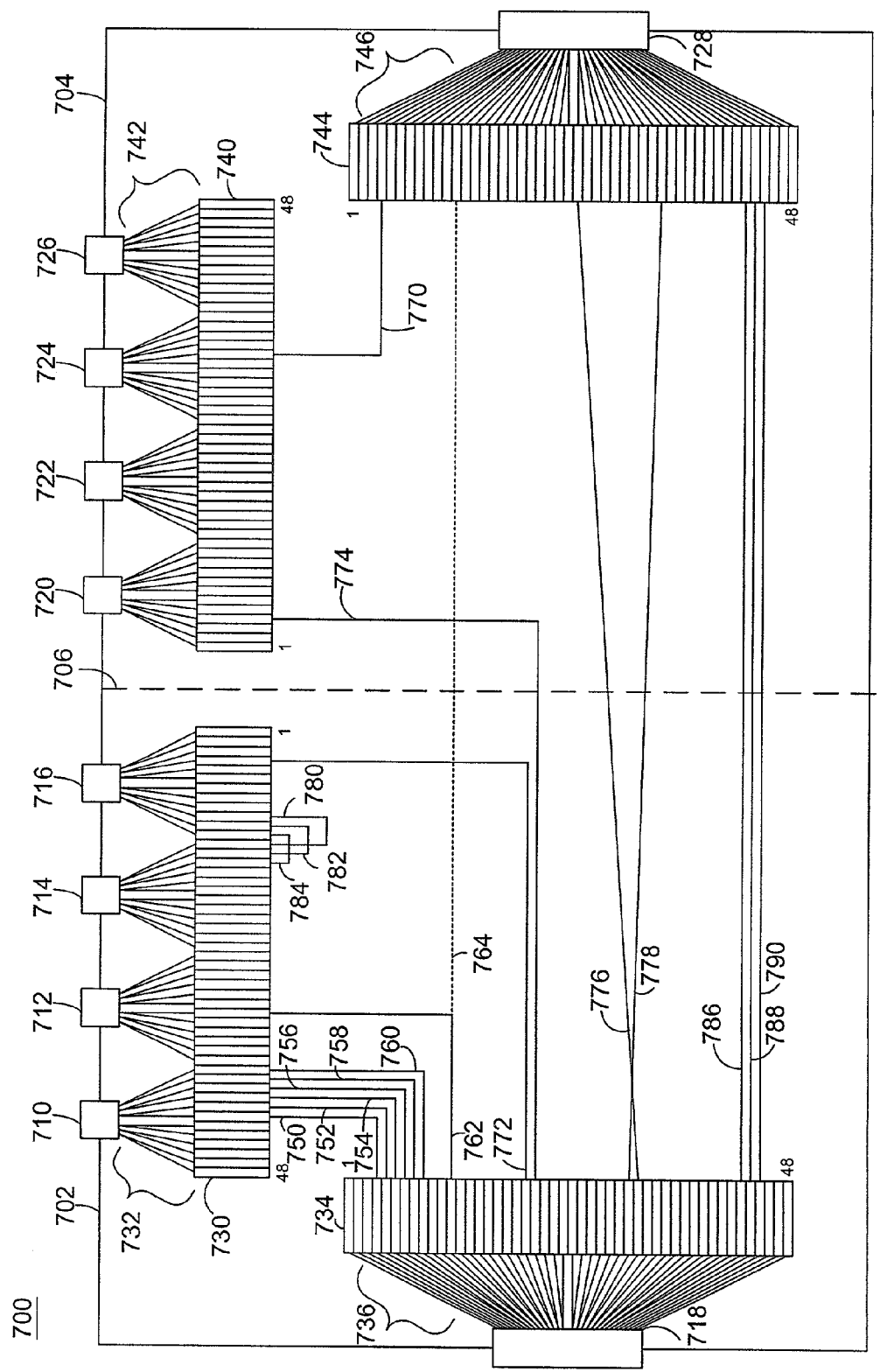
FIG. 7 illustrates an example configuration of subrate timeslots in an add/drop multiplexor.

FIG. 7 shows an example configuration of subrate timeslots in a node 700. The node 700 shows a variety of cross-connects between timeslots entering and leaving the node 700. The cross-connects are portions of subrate paths that define services passing through node 700. The configuration of node 700 provides a context for understanding the discovery, selection, and provisioning of subrate timeslots in the management of subrate services.

The node 700 is comprised of a pair of mated ADMs 702 and 704. ADMs 702 and 704 are mated along line 706 and represent a pair of circuit packs inserted into an appropriate pair of physical slots on an optical node. The ADMs 702 and 704 are associated with an administrative complex (not shown) that oversees discovery, provisioning, and other administrative functions related to the ADMs 702 and 704. The ADM 702 includes a plurality of trib ports 710, 712, 714, and 716 and a line port 718. Similarly, the ADM 704 includes a plurality of trib ports 720, 722, 724, and 726 and a line port 728.

The ADMs 702 and 704 each have a plurality of timeslots associated with their ports. The ADM 702 has a plurality of trib timeslots 730 that are connected to trib ports 710, 712, 714, and 716 via connections 732. The trib timeslots 730 may be numbered sequentially 1 thru 48. In the alternative, they may be numbered in groups of 12 associated with a particular one of the trib ports 710, 712, 714, and 716. The ADM 704 has a plurality of trib timeslots 740 that are connected to trib ports 720, 722, 724, and 726 via connections 742. The trib timeslots 740 of ADM 704 may be numbered similarly. The ADM 702 also has a plurality of line timeslots 734 that are connected to line port 718 via connections 736. The line timeslots 734 are numbered sequentially 1 thru 48. The ADM 704 has a plurality of line timeslots 744 connected to line port 728 via connections 746. The line timeslots 744 are numbered similarly to the line timeslots 734.

When referring to the subrate timeslots of node 700, a user or element management system may use a hierarchy of designations. At the highest level, there is an identifier for the node itself. Below that, there is a physical slot designation corresponding to the locations into which ADMs 702 and 704 are inserted. This physical slot designation is important for determining whether one is talking about the east line port 728 or the west line port 718 for the node 700. The physical slot designation is also important for distinguishing between the trib timeslots 710, 712, 714, and 716 on ADM 702 and the trib timeslots 720, 722, 724, and 726 on ADM 704. The next level of designation is a port number. Port designations allow a user or the element management system to distinguish between multiple ports of the same type in the same ADM. For example, trib ports 710, 712, 714, and 716 would each have a port number (most likely 1–4). Trib ports 720, 722, 724, and 726 would be designated similarly. Port designations are less important for the line ports 718 and 728, as there is only one line port per ADM (though this may not always be the case). In this example, the physical slot designation effectively operates as a port designation for the line ports 718 and 728. The final level of identification is the individual subrate timeslots associated with each of the ports. The individual timeslots within the subrate timeslots 730, 734, 740, and 744 are each provided with a sequential identifier. The identifiers may be grouped by port or by physical slot and port type. So, a typical designation for a timeslot in the node 702 would be something like NodeName:PhysicalSlot#:Port#:Timeslot# or ADMNODE4:slot 5:Port 1:timeslot 3.

The node 700 has a number of cross-connects 750–790 already provisioned. The provisioned cross-connects 750–790 reflect a portion of a variety of subrate circuits. For example, cross-connects 750, 752, 754, 756, 758, and 760 may represent end node (or add/drop) paths for a pair of STS-3 services. Each of the STS-3 services includes three paths from trib timeslots connected to trib port 710 to line timeslots connected to line port 718. Cross-connects 762 and 764 represent end node paths for an STS-1 services traveling in opposite directions out of the node 700. This pair of STS-1 services enters through a single trib timeslot and reflect a single STS-1 service with a line protection scheme (e.g., SUPSR) that routes duplicate traffic in both directions around a ring topology. The STS-1 service of cross-connect 762 is traveling west and is the working line, while the STS-1 service of cross-connect 764 is traveling east. The dotted line of cross-connect 764 represents that it is a protection line, rather than a working line. Cross-connects 770, 772, and 774 are also end node paths for STS-1 services. Cross-connects 776 and 778 represent pass through paths for STS-1 services from the line port 718 of ADM 702 to the line port 728 of ADM 704. Cross-connects 776 and 778 demonstrate that cross-connects within a node may interconnect line timeslots that do not have the same number. Cross-connects 780, 782, and 784 represent hairpin paths for an STS-3 service. A hairpin path enters and leaves through the trib ports of the same ADM. Cross-connects 786, 788, and 790 represent a simple pass through STS-3 service. Countless other subrate services and cross-connect configurations are possible. Managing the complexity of varied cross-connects in multiple nodes within a subrate network is the function of an element management system and, more specifically, a subrate service management component.

Figure 8:
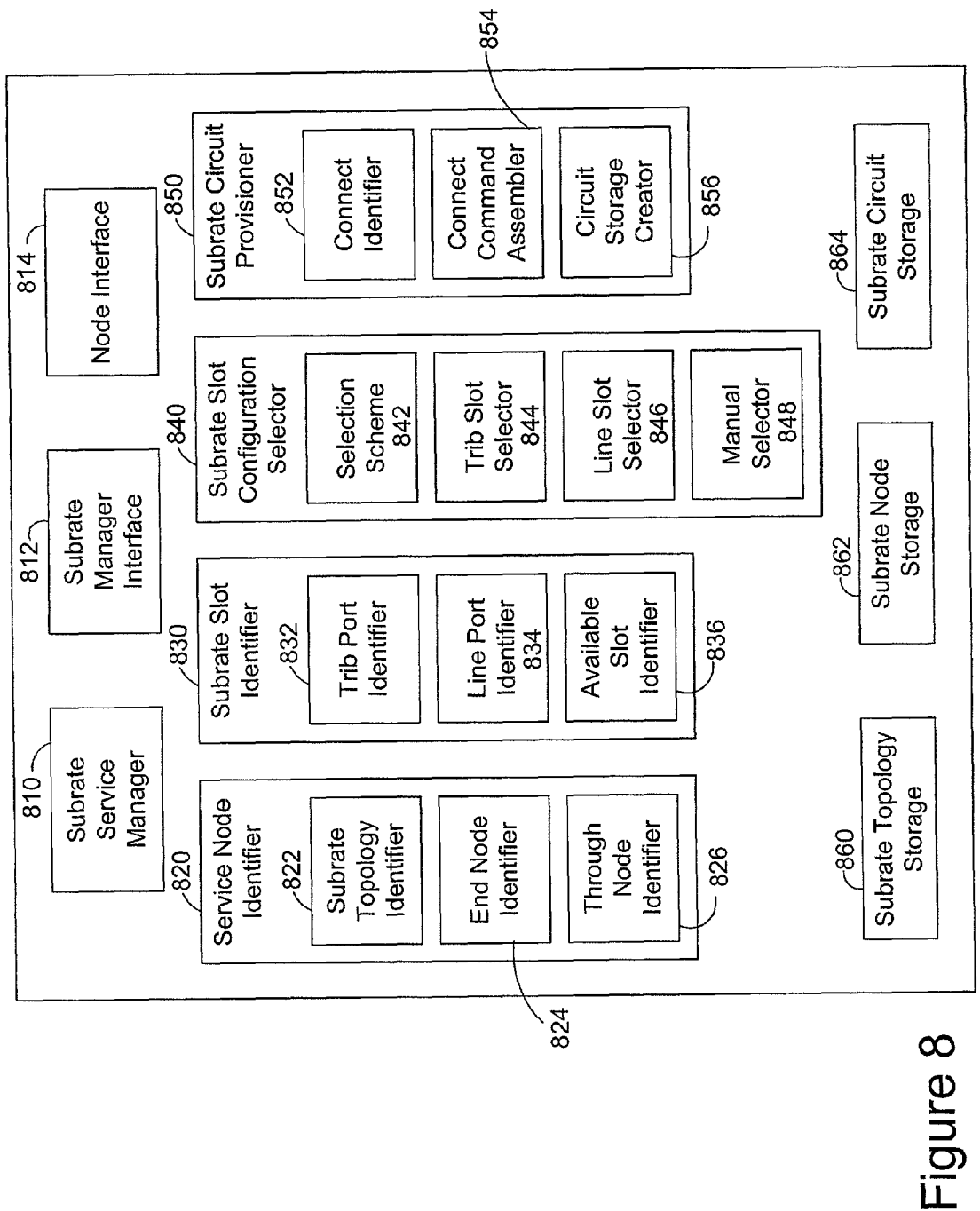
FIG. 8 illustrates a block diagram for a subrate path management component of a network management application in accordance with the present invention.

FIG. 8 shows subrate service management component 800 of an element management system. Component 800 includes a subrate service manager 810, a subrate manager interface 812, and a node interface 814. The subrate service manager 810 is a module for coordinating and overseeing the operation of a number of other task oriented modules. Example modules that might be managed by the subrate service manager 810 include a service node identifier 820, a subrate timeslot identifier 830, a subrate timeslot configuration selector 840, and a subrate circuit provisioner 850. Component 800 also includes a subrate topology storage 860, a subrate node storage 862, and a subrate circuit storage 864. The subrate topology storage 860, the subrate node storage 862, and the subrate circuit storage 864 provide data sources associated with particular subrate networks, ADM nodes, and previously provisioned circuits. This information underlies the functions of component 800. The methods and interfaces implemented by the component 800 may be further understood via the methods shown in FIGS. 9–15 and user interfaces of FIGS. 16–21 and the description below related thereto.

The subrate service manager 810 is tasked with overseeing management of subrate networks and coordinating the data and operations of other components. Specifically, the subrate service manager 810 may coordinate the discovery, selection, provisioning, and management of subrate circuits. In order to do so, the subrate service manager 810 provides a gateway function for various management operations and data sources. The subrate service manager 810 may be embodied in a software objects with attributes and operations for initiating staged management functions. For example, the subrate service manager 810 may initiate identification of the nodes for a desired subrate service, discovery or other identification of subrate timeslots available in the identified nodes, construction of a timeslot configuration, provisioning of the selected nodes in accordance with the timeslot configuration. These functions combine to provide management of new subrate services. These individual functions are embodied the service node identifier 820, the subrate timeslot identifier 830, the subrate configuration selector 840, and the subrate circuit provisioner 850. The subrate service manager 810 initiates the functions of each of these modules and maintains session data through the process. The subrate service manager 810 receives and displays data through the subrate manager interface 812.

The subrate manager interface 812 provides one or more user interfaces for exchanging data with the subrate service manager 810 and other components. The user interfaces include a navigable series of displays with embedded forms for receiving data. The user interfaces may include interactive forms and other display components. Example user interfaces for use with a subrate service manager are provided in FIGS. 16–21 and described in detail below.

The node interface 814 provides a messaging interface to the administrative complexes associated with one or more nodes in the subrate network. The nature of the messaging interface is largely dependent upon the administrative messaging protocols used in the hardware and software embodying the optical network in which the subrate network resides. The management functions of the subrate service manager 810 may require the use of queries and provisioning commands to the administrative complexes.

The service node identifier 820 provides a functional stage in the selection and provisioning of new subrate circuits. The service node identifier 820 provides information to the subrate service manager 810 regarding the topology and nodes of a selected subrate network. This information may be used by the subrate service manager 810 when providing selection options through the subrate manager interface 812 and may be used by other modules as well. The service node identifier 820 includes a subrate topology identifier 822, an end node identifier 824, and a through node identifier 826. The service node identifier 820 may use a combination of data retrieved from the subrate topology storage 860, service descriptions provided through the subrate manager interface 812, and logical operations to identify the subrate topology, end nodes, and through nodes. In one embodiment, the service node identifier 820 assembles an order list of nodes to be used by other modules and operations.

The subrate timeslot identifier 830 provides another functional stage in the selection and provisioning if new subrate circuits. The subrate timeslot identifier 830 provides information to the subrate service manager 810 regarding the available timeslots in the nodes in the selected path. The information may be used by the subrate service manager 810 when providing selection and modification options through the subrate service manager. The information may also be used for the selection of a timeslot configuration. The subrate timeslot identifier 830 includes a trib port identifier 832, a line port identifier 834, and an available timeslot identifier 836. The subrate timeslot identifier 830 may use a combination of data retrieved from the subrate node storage 862, service descriptions (notably port selections) provided through the subrate manager interface 812, and logical operations to identify available timeslots in the desired lines and ports.

The subrate timeslot configuration selector 840 provides another functional stage in the selection and provisioning of new subrate circuits. The subrate timeslot configuration selector 840 selects a timeslot configuration for each of the nodes in the desired service. The timeslot configuration is used by the subrate circuit provisioner 850 to determine the cross-connects for each node and assemble a command message for provisioning each node. The subrate timeslot configuration selector 840 includes a selection scheme 842, a trib timeslot selector 844, a line timeslot selector 846, and a manual selector 848. The selection scheme 842 provides logic for selecting default trib timeslots and line timeslots from among the available timeslots identified by the subrate timeslot identifier 830.

The subrate circuit provisioner 850 provides still another functional stage in the selection and provisioning of the new subrate circuits. The subrate circuit provisioner 850 assembles command messages for the nodes in the selected service that cause the nodes to reconfigure their cross-connect to provision the desired circuits. The subrate circuit provisioner 850 includes a cross-connect identifier 852, a cross-connect command assembler 854, and a circuit storage creator 856. The cross-connect identifier 852 calculates the cross-connects for each node based upon the timeslot configuration generated by the subrate timeslot configuration selector 840. The cross-connect command assembler 854 prepares cross-connect provisioning commands for each node in accordance with the node interface 814. The circuit storage creator 856 stores information about the created circuit in the subrate circuit storage 864.

The subrate topology storage 860, the subrate node storage 862, and the subrate circuit storage 864 are substantially as described above with regard to FIG. 6.

E. Methods

Figure 9:
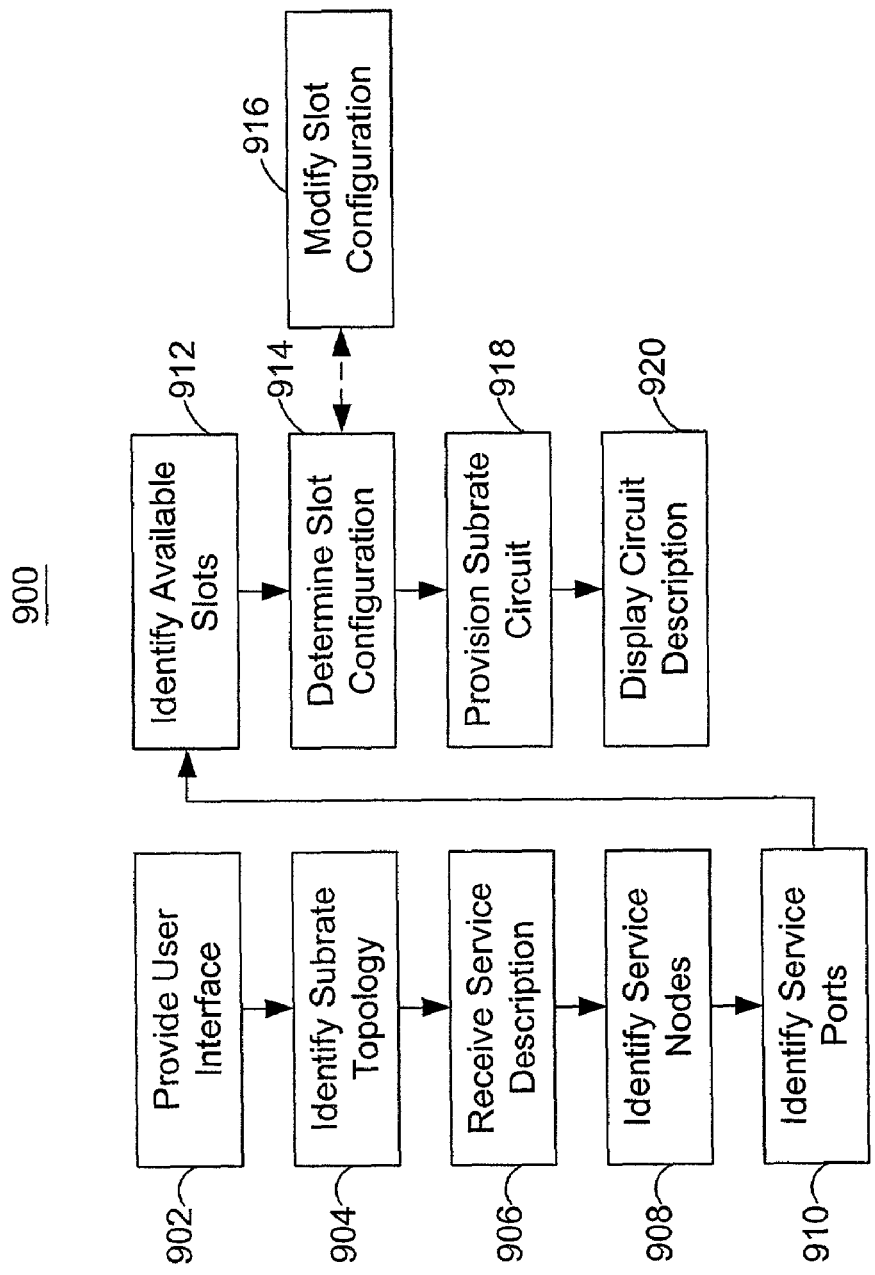
FIG. 9 is a flowchart of a method of managing subrate services in accordance with an embodiment of the invention.

FIG. 9 shows an example method of managing subrate services. Specifically, FIG. 9 shows a method 900 of selecting and provisioning a desired subrate circuit in a selected subrate network. The method 900 may be implemented using an element management system with subrate service management component, such as the systems described above with regard to FIGS. 1–8. While the steps of method 900 are shown sequentially, they may be accomplished in varying orders or with more complex function and time flow.

In step 902, a user interface is provided. For example, the user may navigate an interface such as the interface of FIGS. 15–21. The user interface guides the user through a series of steps for describing and reviewing a desired subrate service and initiating provisioning of the desired subrate service.

In step 904, a subrate topology is identified. For example, based upon the selection of a particular subrate network, the element management system may access a subrate topology storage for information about the subrate networks nodes and configuration. Further details of a method of identifying a subrate topology are provided below with regard to FIG. 10. Information from the subrate network topology is used by the element management system to prompt the user for a description of the desired network.

In step 906, a service description is received. For example, the element management system may receive a description of the desired service that includes the end nodes, trib and line protection schemes, service capacity, port selections, and, optionally, modifications to the timeslot configuration for the circuit. Further details of a method of receiving a service description is provided below with regard to FIG. 11. Alternate embodiments of step 906 may require more or less information for the user and may include additional logic for automatically selecting features, such as trib and line ports.

In step 908, the nodes for the service are identified. For example, based upon the selection of end nodes for the service, as well as any line protection scheme, the element management system may identify the pass through nodes for as many paths as are required for the service. The nodes for the service are identified by traversing the subrate network topology from one end node to the other. The service nodes may be identified in a sequential list for one or more paths for the circuit (e.g., a working path and a protection path).

In step 910, the ports for the service are identified. For example, the element management system may identify the available trib and line ports in the end nodes and receive a user selection as part of the service description. Identification of ports may include the identification of both working ports and protection ports. In one embodiment, the protection ports are automatically selected by the element management system based upon selection of the working ports and the selected protection schemes. In one embodiment, identification of ports may be based upon information retrieved from subrate node storage related to each of the nodes in the service.

In step 912, available timeslots are identified. For example, the ports conforming to one or more paths through the nodes may be identified for each node in the service. The available timeslots are identified based upon identifying all existing timeslots in the relevant ports and identifying the timeslots among those that are already provisioned for another circuit. In one embodiment, the available timeslots may be identified based upon information retrieved from subrate node storage related to the timeslot configuration of the nodes in service. Further details of a method of identifying available timeslots are provided below with regard to FIG. 12.

In step 914, a timeslot configuration is identified. For example, the configuration of available trib timeslots and/or adjacent available line timeslots may be determined for each node in the service. The timeslot configuration provides sufficient information to calculate the appropriate cross-connect configuration for each node in the service. Further details of a method of identifying a timeslot configuration are provided below with regard to FIG. 12.

In step 916, the timeslot configuration is optionally modified. For example, the user may be provided with the option of reviewing the automatically selected timeslot configuration and modifying the selections on a node-by-node basis. The element management system may provide a modification function that allows the user to graphically manipulate the timeslot configurations, while enforcing the limitations of an operable timeslot configuration that does not interfere with previously provisioned circuits. In one embodiment, the timeslot modification step is provided as an option outside the normal flow of the circuit creation interface. Further details of a method of modifying the timeslot configuration are provide below with regard to FIG. 15.

In step 918, the subrate circuit is provisioned. For example, the timeslot configuration may be used to calculate the cross-connects for each node and the cross-connect configurations may be communicated to the administrative complexes governing the individual nodes. The administrative complexes, receiving the appropriate commands, cause the circuit to be provisioned for use in the desired service and communicate completion of the provisioning back to the element management system. Further details of a method of provisioning the subrate circuit are provide below with regard to FIG. 14.

In step 920, a description of the provisioned subrate circuit us provided. For example, once the element management system confirms provisioning of the circuits, a display is provided describing the service selected and the resulting circuit that was provisioned. Details of the provisioned circuit may include identification of the timeslot configuration and cross-connects. The user interface for the description display may allow the user to restart the process for another subrate service and circuit.

Figures 10, 11, 12:
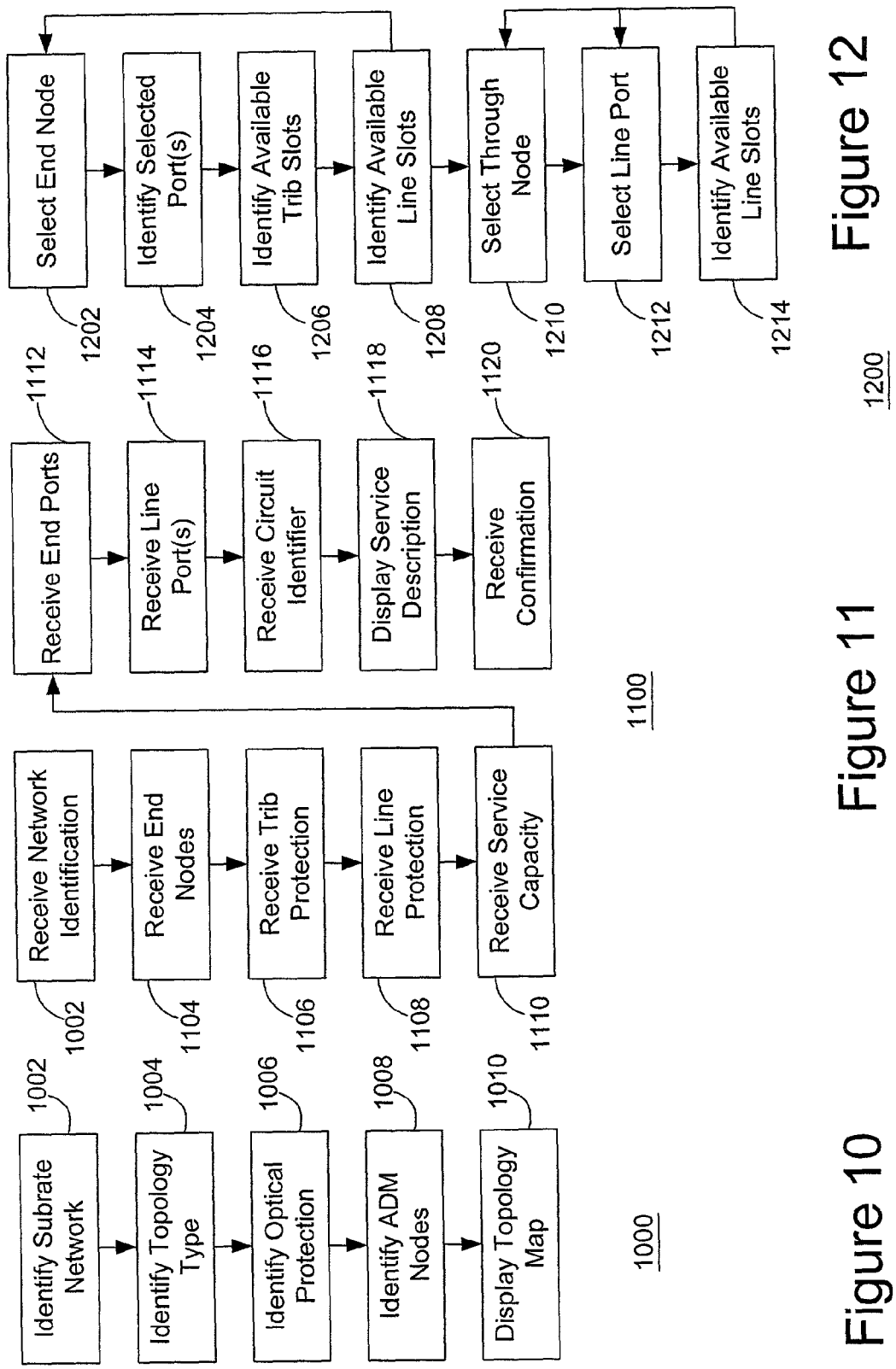
FIG. 10 is a flowchart of a method of identifying a subrate topology in accordance with an embodiment of the invention.
FIG. 11 is a flowchart of a method of receiving a service description in accordance with an embodiment of the invention.
FIG. 12 is a flowchart of a method of identifying available timeslots in accordance with an embodiment of the invention.

FIG. 10 shows an example method 1000 of identifying a subrate topology for the creation of a subrate circuit. In step 1002, a subrate network is identified. For example, the user may identify the subrate network as part of the service description or may invoke the circuit creation method through a subrate network specific interface. In step 1004, a topology type for the subrate network is identified. For example, the element management system may query a data source containing a description of the identified subrate network, such as subrate topology storage. The topology type reflects a representative structure for arranging nodes in the network, such as ring, cluster, or line. In step 1006, optical protection schemes are identified. For example, the protection scheme of the underlying optical channel may determine the availability of certain tributary protection schemes. The element management system uses information regarding the optical protection scheme to determine the tributary protection schemes that a user may select when describing the desired service. The optical protection scheme may reside in subrate topology storage or within another resource of the element management system. In step 1008, ADM nodes are identified. For example, the element management system may read the list of ADM nodes and their relative positions in the topology from the subrate topology storage. In step 1010, a topology map is displayed. For example, the element management system may generate and display to the user a graphical representation of the subrate network topology, the node locations, and identifiers for the nodes. The topology map provides a reference for the user when describing the desired service.

FIG. 11 shows an example method 1100 of receiving a service description for creation of a subrate circuit. Receipt of the service description may be an interactive process wherein the element management system provides a list of options, receives a user response, carries out one or more functions, provides another series of options, and so on until the service description is complete. In the alternative, the information in the service description could provided in a single step, such as a comprehensive service description form. Additionally, the user may be able to navigate the interface for the service description to review and modify previously provided information. In some embodiments, selections may be made automatically by the element management system based upon prior user input. In these embodiments, the user may be provided with the option of modifying these default selections. In step 1102, network identification is received. For example, the user may select the subrate network upon initiating the process or otherwise select the subrate network from the subrate networks managed by the element management system. In step 1104, selections of the end nodes for the service are received. For example, the user may be provided with a list of the ADM nodes in the service from which to choose two end nodes. In step 1106, selections of trib protection for the end nodes are received. For example, the user may be provided with a list of trib protection schemes that are available based upon the underlying optical network or other considerations. In step 1108, selection of line protection for the circuit is received. For example, the user may be provided with a list of line protection schemes that are available based upon the subrate network topology or other considerations. In step 1110, selection of service capacity is received. For example, the user may be provided with a list of capacities ranging from STS-1 to the maximum available trib port capacity for the subrate network. In step 1112, selection of the end ports is received. For example, the end port selections may include ports selected by the user based upon the element management system's identification of available ports. The end ports selected will include both working ports and protection ports where an appropriate protection scheme is in place. In step 1114, selection of one or more line ports is received. For example, the user may be provided with east and west line port options for one of the end nodes. The selection determines the path of the working line. Where there is a relevant protection scheme in place, the protection line may be automatically selected based upon the selection of the working line or may be selected by the user. In step 1116, a circuit identifier is received. For example, the user may be prompted by the element management system to provide a name by which the circuit and its information may be accessed and managed. In step 1118, the service description is displayed. For example, a summary of the service description information selected by the user and the element management system may be displayed to the user. In step 1120, confirmation that the service description reflects the desired service is received. For example, once the complete service description is displayed, the user may be provided with an option by which to confirm the service description. Confirmation of the service description is used by the element management system to initiate further processing, such as provisioning of the subrate circuit.

FIG. 12 shows an example method 1200 of identifying available timeslots in the service nodes for the desired subrate service. In step 1202, an end node is selected. For example, one of the two end nodes is selected on the first pass through step 1202 and the second of the two end nodes is selected on the second pass through step 1202. In step 1204, the selected ports for the selected end node are identified. For example, the element management system may identify one or more trib ports and one or more line ports, depending on the protection schemes in place. In one embodiment, the selected ports are identified based upon user selection from available ports described in the subrate node storage for the selected end node. In step 1206, available trib timeslots are identified. For example, for each trib port identified in step 1204, the available trib timeslots associated with the port are identified. In one embodiment, the available trib timeslots are identified based upon information in the subrate node storage for the selected end node. In step 1208, available line timeslots are identified. For example, for each line port identified in step 1204, the available line timeslots associated with the port are identified. In one embodiment, the available line timeslots are identified based upon information in the subrate node storage for the selected end node. Once the available trib and line timeslots for the first selected end node are identified, the process returns to step 1202 and selects the second end node. Once step 1208 is complete for the second end node, the process continues to step 1210. In step 1210, a through node is selected. For example, the element management system selects a node between the first end node and the second end node along one of the service paths. In one embodiment, a list of through nodes is assembled from the information stored in the subrate topology storage and/or subrate node storage for each path (if there are multiple paths). Each time the process returns to step 1210, the next through node on the list is selected, until no through nodes remain. If there are no through nodes, the process terminates with step 1208. In step 1212, a line port is selected. For example, in the first pass through step 1212 for a selected through node, the east line port may be selected. In the second pass through step 1212 for a selected through node, the west line port may be selected. If both east and west line ports have previously been selected for the through node, the process returns to step 1210 to select another through node. In step 1214, the available line timeslots for the selected line port are identified. In one embodiment, the element management system identifies the available line timeslots based upon information retrieved from the subrate node storage for the selected through node. Once step 1214 is complete, the process returns to step 1212 for selection of another line timeslot if a previously unselected line timeslot remains. If no line timeslots remain. the process returns to step 1210 and the next through node is selected. If no through nodes remain, the process is terminated, all available timeslots for the subrate circuit having been identified.

FIG. 13 shows an example method 1300 of determining a timeslot configuration for the subrate circuit. In step 1302, a selection scheme is identified. For example, the element management system may have a default auto-selection scheme based upon selecting the first available timeslots in each port. In one embodiment, a manual selection scheme may be used to override the default selection scheme. In one embodiment, the user may select a selection scheme from a list of selection scheme options. In step 1304, an end node is selected. For example, one of the two end nodes is selected on the first pass through step 1304 and the second of the two end nodes is selected on the second pass through step 1304. In step 1306, trib timeslots for the selected end node are assigned. For example, the element management system may evaluate the available trib timeslots identified for the selected end node and assign a number of timeslots based upon the service capacity and the selection scheme. In one embodiment, the element management system stores the assigned trib timeslots in the timeslot configuration. Once step 1306 has been completed for the first selected end node, processing returns to step 1304 for selection of the second end node. Once step 1306 has been completed for both end nodes, processing continues to step 1308. In step 1308, an adjacent node pair is selected. For example, the node element system may start from one end node and its adjacent node down the working line path. On subsequent passes through step 1308, additional node pairs will be selected until each through node has been analyzed in conjunction with both of its neighbors in the path. End nodes may be analyzed paired with one or both neighbors, depending on the topology and protection schemes in place. In step 1308, the available line ports for a path between the nodes of the adjacent node pair are identified. For example, the adjacent nodes should have matching available timeslots in the selected line ports between them. In step 1310, line timeslots for the selected node pair are assigned. For example, the element management system may evaluate the available line timeslots identified for the selected node pair in their facing ports. The element management system assigns a number of timeslots based upon the capacity of the desired service and the selection scheme. In one embodiment, the element management system stores the assigned line timeslots in the timeslot configuration. Once step 1310 has been completed for the selected node pair, processing returns to step 1308, for selection of additional node pairs. Once no unprocessed node pairs remain, processing is terminated and the timeslot configuration is complete.

FIG. 14 shows an example method 1400 of provisioning a subrate circuit fulfilling the desired subrate service. In step 1402, a node is selected from among the service nodes. For example, the nodes may be selected in order from a list of service nodes. When processing returns to step 1402, the next node in the list is selected. In step 1404, timeslot selections are identified for the selected node. For example, the element management system may retrieve the timeslot selections for the node from the timeslot configuration for each path through the node. In step 1406, cross-connects are calculated for the selected node. For example, the element management system may generate a list of cross-connects for each timeslot pair in the identified timeslot selections. In step 1408, a cross-connect provisioning command is created. For example, the element management system may generate a command message in a format appropriate for communication with the administrative complex of the selected node. In one embodiment, the command message includes a series of provision commands associated with timeslot pairs for the cross-connects for each path through the node. In step 1410, the cross-connect provisioning command is communicated to the node for execution. For example, the element management system may communicate the command message assembled in step 1408 to the selected node using a node interface protocol appropriate to the node. In step 1412, provisioning of the cross-connect is confirmed. For example, the element management system may receive a response message from the administrative complex associated with the selected node. In one embodiment, the response message confirms receipt of the command message and reports any errors in executing the provisioning command. Once step 1412 is complete for a selected node, the process returns to step 1402 to select another node. Once no nodes remain, processing continues to step 1414. In one embodiment, steps 1402–1412 are executed in parallel for all of the nodes in the service. In step 1414, a circuit description for the provisioned circuit is stored. For example, the element management system may store the circuit description under an circuit identifier provided by the user. In one embodiment, the circuit description is stored in a subrate circuit storage. The circuit description may be used by the element management system to manage and modify the provisioned circuit. In one embodiment, the information in the circuit description is used to identify used ports and timeslots when the user attempts to create new circuits in the same subrate network and nodes.

FIG. 15 shows an example method 1500 of manually creating or receiving modifications to a timeslot configuration for a selected circuit. In step one, a node selection is received. For example, the user may select from a drop down menu one of the nodes in the subrate service. In step 1504, a path selection is received. For example, the user may select from a drop down menu one of the paths through the selected node. In step 1506, timeslots for the selected ports corresponding to the selected path are displayed. For example, the element management system may display a list of all existing timeslots in the two ports selected for the selected path, such as the east and west line ports for a pass through node. In step 1508, used timeslot identifiers are provided. For example, the element management system may provide a used timeslot indicator, such as shading, to indicate which timeslots are already being used by a previously provisioned circuit. In the alternative, the element management system may simply not display the used timeslots among the timeslots displayed. In step 1510, a default cross-connect identifier is displayed. For example, the element management system may provide a cross-connect indicator showing which timeslots in each of the ports are selected by the default selection scheme. In the alternative, no default cross-connect identifier may be provided and it will be up the user to manually select a cross-connect for the path. Steps 1512, 1514, and 1516 represent options for manually selecting a cross-connect or modifying the default cross-connect. In step 1512, a cross-connect may be deleted. For example, the user may have the option to delete one or all of the default or previously selected cross-connects in a chosen node and path. In step 1514, a cross-connect may be moved. For example, the user may have the option of moving a currently selected timeslot to another available timeslot. In step 1516, a cross-connect may be created. For example, where no cross-connect or an insufficient number of cross-connects have been selected, such as after default cross-connects have been deleted, the user has the option of creating a new cross-connect. As long as a valid timeslot configuration for the desired circuit is presently selected, the process may proceed to step 1518. Otherwise, the user may have to continue with steps 1512, 1514, and 1516 until a valid configuration is selected or the process is aborted. In step 1518, the timeslots and cross-connects are registered as the new timeslot configuration and the modification process is terminated.

F. User Interface

Figure 18:
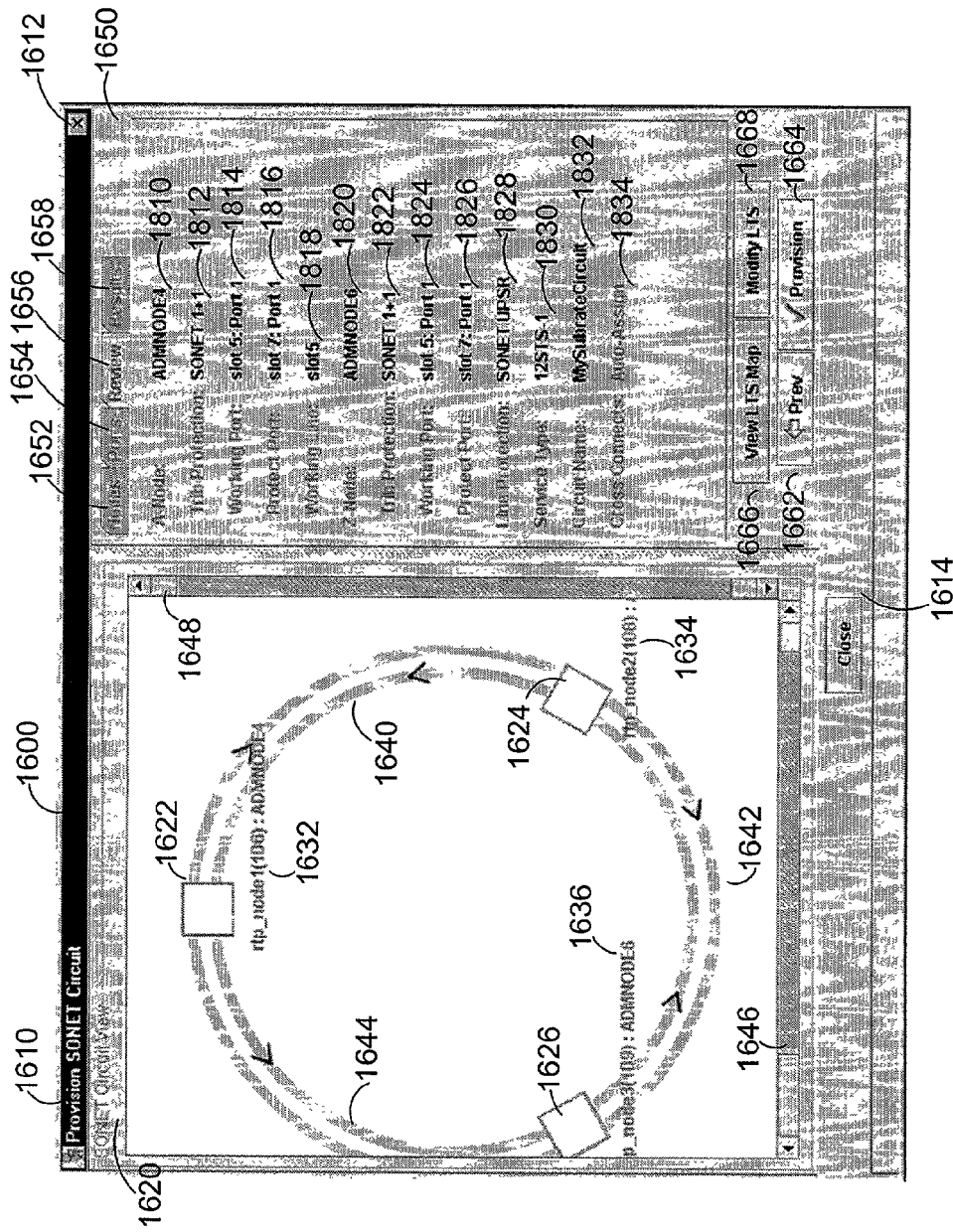
Figure 19:
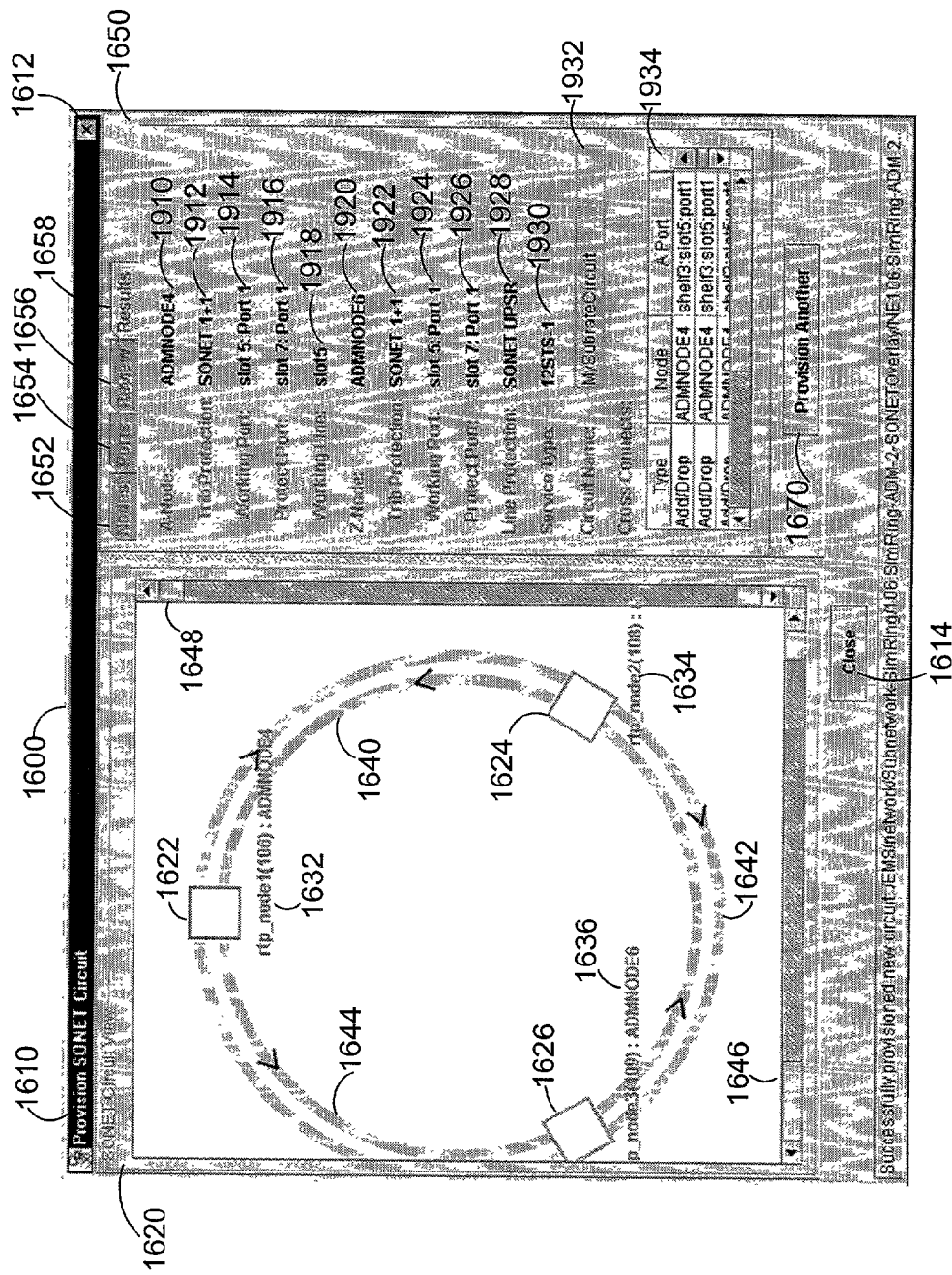
Figure 20:
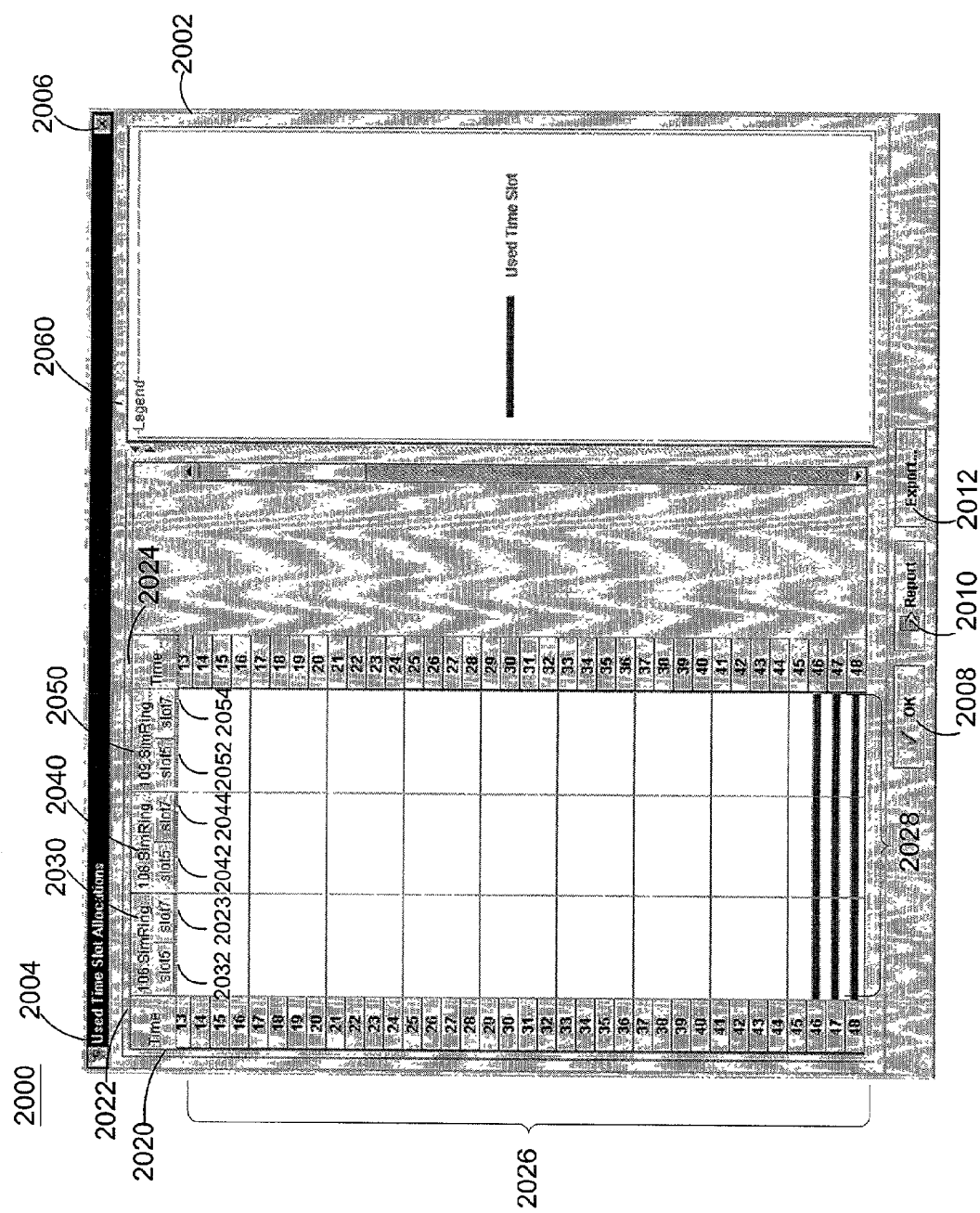
Figure 21:
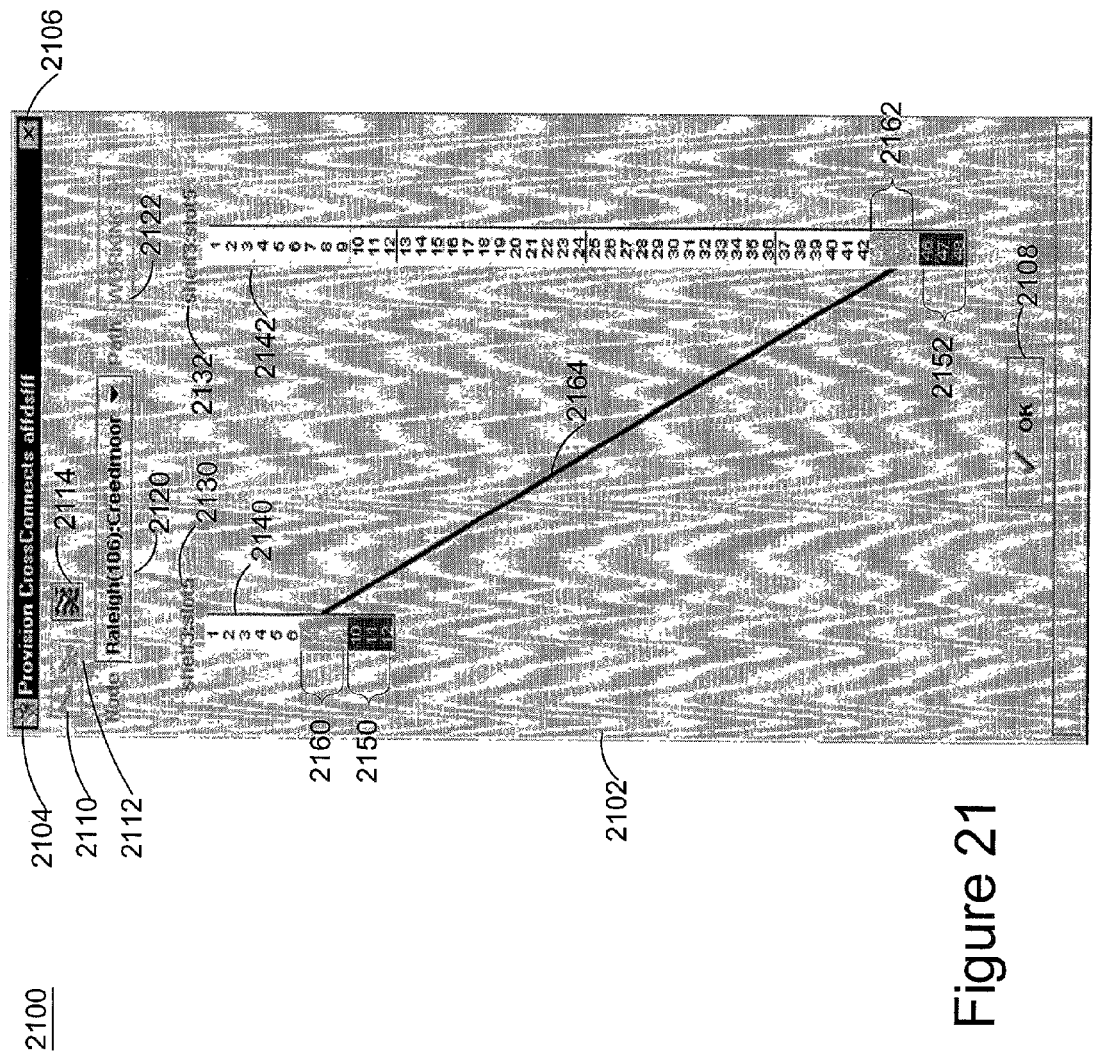

FIGS. 16–21 show example graphical user interfaces for managing subrate services. FIGS. 16–19 depict a wizard for describing and provisioning a new subrate service. FIG. 20 depicts a map for displaying the timeslots used across multiple nodes and services within the subrate network. FIG. 21 displays an interface for modifying the timeslot configuration of a desired or existing service. The interfaces shown in FIGS. 16–21 are depicted as windows, such as are commonly displayed on a computer screen or other display device in conventional computer systems. The interfaces include information for display, forms for receiving user input, and icons or buttons for initiating certain functions. Some of the information, forms, and icons may be common among interfaces and may include standard features appropriate to the user interface standards and look and feel of a given platform. The various windows shown are interrelated and navigated as described below. While the information, forms, and icons are shown and described with a particular arrangement, including distribution across multiple windows, the same information, forms, and icons may be displayed in alternate arrangements.

FIGS. 16–19 show a series of interrelated interfaces within a window 1600. The series of interfaces define a wizard for describing and provisioning a subrate service, as well as accessing additional service management features, such as the subrate timeslot map of FIG. 20 and the timeslot modification interface of FIG. 21. The window 1600 may be invoked from an element management system using an appropriate command, menu selection, or other action. For example, the window 1600 may be invoked by identifying a subrate network administered by the element management system and selecting a provision new circuit option. The window 1600 may be linked to an underlying session under the subrate service management module of the element management system. The window 1600 includes a title bar 1610 and close icons 1612 and 1614, as are commonly used in window interfaces. The close icons 1612 and 1614 allow a user to terminate the window 1600 and end the underlying session.

The window 1600 includes two major components: a topology map interface 1620 and a tabbed wizard interface 1650. The topology map interface 1620 displays basic topology information for the subrate network in which the circuit is to be provisioned. The tabbed wizard interface allows the user to describe a desired service through a series of input steps, verify the desired service, and automatically provision a circuit embodying the desired service.

The topology map interface 1620 displays the topology of the subrate network and identifies the ADM nodes in the subrate network. The topology map interface includes node representations 1622, 1624, and 1626, node identifiers 1632, 1634, and 1636, and path representations 1640, 1642, and 1644. The node representations 1622, 1624, and 1626 indicate the location of ADM nodes. The node identifiers 1632, 1634, and 1636 provide identifying information for each of the displayed node representations 1622, 1624, and 1626. The node identifiers 1632, 1634, and 1636 may include a unique identifier for the ADM node, identifiers corresponding to the node's position in the broader optical network (e.g., physical node), and/or information describing the type or equipment embodying the node. The path representations 1640, 1642, and 1644 indicate the relationships among the displayed nodes. The path representations 1640, 1642, and 1644 are generated based upon the topology type of the subrate network. The topology map interface 1620 is for a ring topology. In one embodiment, the topology map interface 1620 is generated from information stored in a subrate topology storage. The topology map interface 1620 also includes scroll bars 1646 and 1648 for changing the view of the topology map displayed where the map is larger than the display area.

Figure 16:
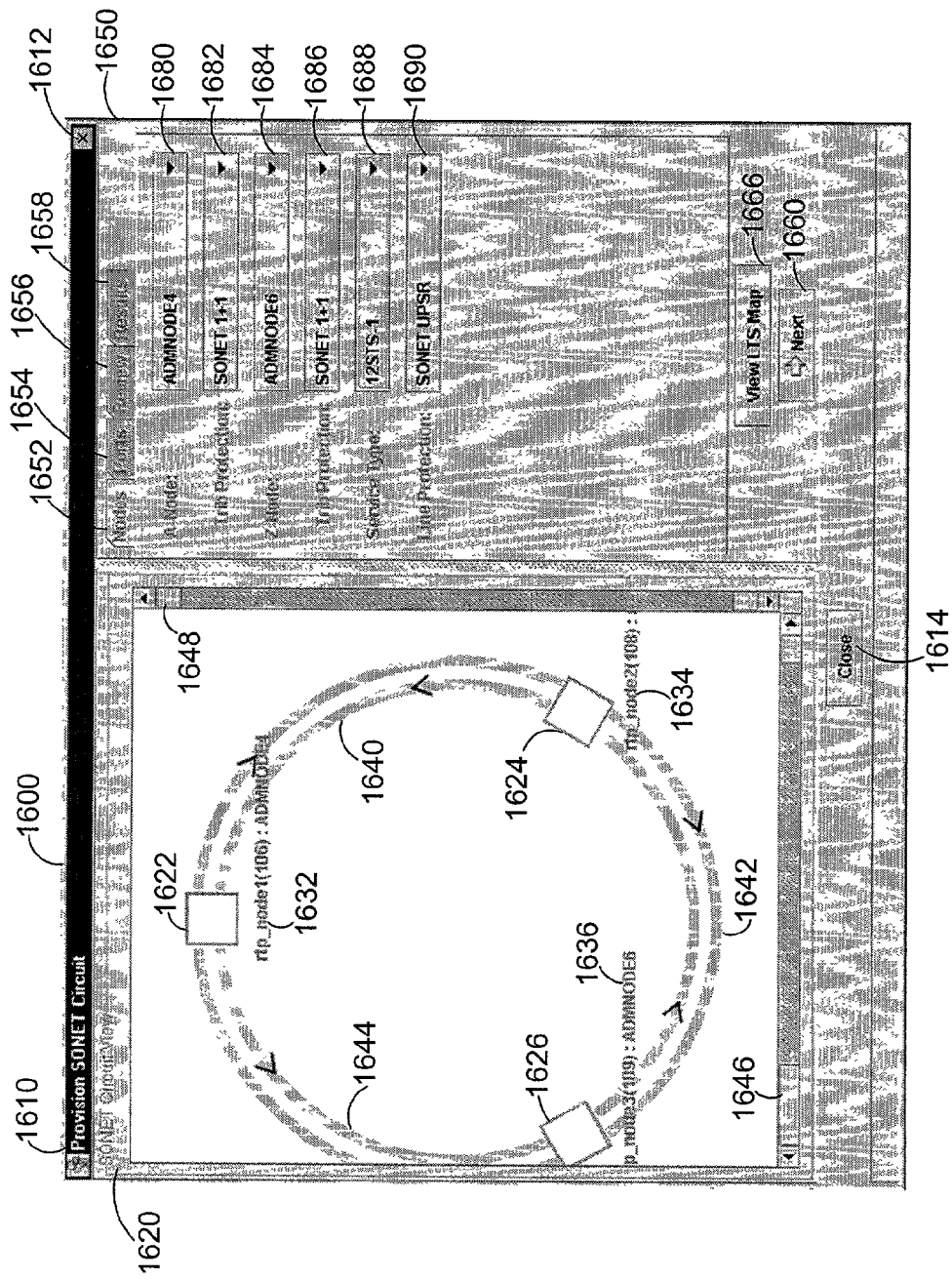
FIGS. 16–21 are an example graphical user interface for managing subrate paths in accordance with an embodiment of the invention.
Figure 17:
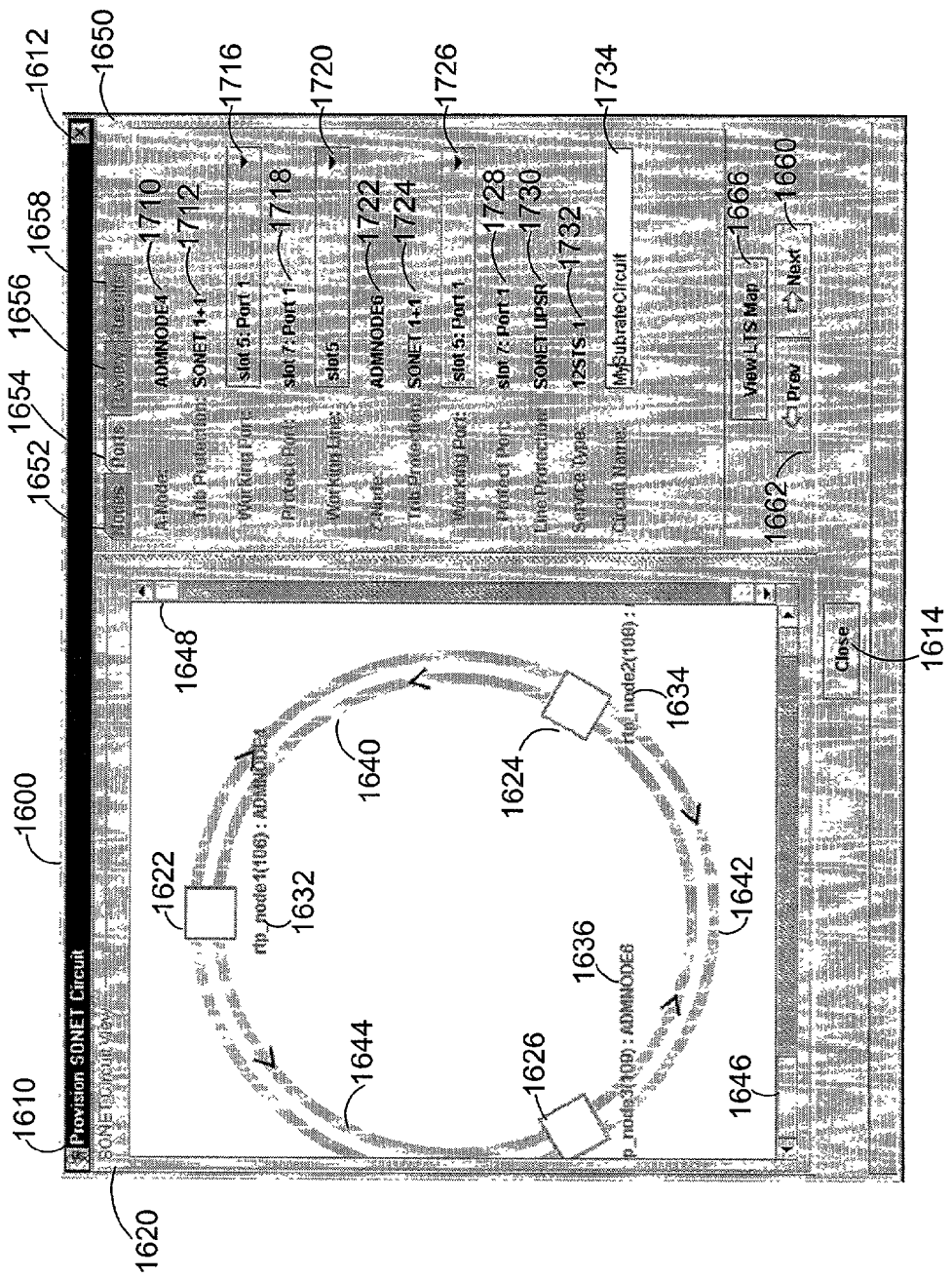

The tabbed wizard interface 1650 provides a series of steps for defining a desired service and provisioning that service. The tabbed wizard interface 1650 includes a nodes tab 1652, a ports tab 1654, a review tab 1656, and a results tab 1658. The contents of the respective tabs are shown alternately in a common space as the user navigates the wizard. Alternate buttons for navigating the steps are shown depending on the tab contents being displayed. The nodes tab 1652 allows the user to specify end nodes, service type, and protection schemes for the service and is shown in FIG. 16. The ports tab 1654 displays the prior selections and allows the user to specify end and line ports for the service, as well as a circuit name. The contents of the ports tab 1654 are shown in FIG. 17. The review tab 1656 displays the prior selections and may allow the user to choose a selection scheme or access a timeslot modification interface to manually select timeslots. The contents of the review tab 1656 are shown in FIG. 18. The results tab 1658 displays the prior selections, as well as the timeslot selections or cross-connects used to provision the service. The contents of the results tab 1658 are shown in FIG. 19.

The tabbed wizard interface 1650 includes a number of navigation options displayed below the tab contents. The combination of navigation options available varies depending upon the current tab contents being displayed. The navigation options include navigating between adjacent tabs, restarting the wizard for another circuit, viewing timeslot map for the subrate network, and accessing a timeslot modification interface. The navigation options are embodied in a next button 1660, a previous button 1662, a provision button 1664, a view timeslot map button 1666, a modify timeslots button 1668, and a provision another button 1670. The next button 1660 allows the user to navigate to the next tab, registering any selections made through the current tab's forms. Selection of the next button 1660 may also initiate additional processing. The previous button 1662 allows the user to navigate to the previous tab. Any selection registered through the prior selection of the next button 1660 will be overwritten when the next button 1660 is selected again. The provision button 1664 is an alternate embodiment of the next button 1660. It provides additional notification to the user that selection will initiate additional processing. Specifically, cause the element management system to command the individual nodes to provision their cross-connects in accordance with the defined service. Note that there is not a corresponding previous button displayed in the tab following the provision button 1664. The view timeslot map button 1666 allows the user to access a timeslot map showing the available and unavailable timeslots across all nodes on the subrate network. An example timeslot map is shown in FIG. 20. Workflow returns to the tab from which the view timeslot map button 1666 was selected when the timeslot map interface is terminated. The modify timeslots button 1668 allows the user to access a timeslot modification interface to manually select or modify the timeslot selections for a desired service. An example timeslot modification interface is shown in FIG. 21. Workflow returns to the tab from which the modify timeslots button 1668 was selected when the timeslot modification interface is terminated. The close buttons 1612 and 1614 provide the additional option of terminating the provisioning session. The provision another button 1670 allows the user to return to the nodes tab 1652 and begin the process of selecting and provisioning another circuit.

The nodes tab 1652 provides an interface for selecting the end nodes, service capacity, and protection schemes to be used in the service. In one embodiment, the nodes tab 1652 provides limited options based upon the topology and/or available resources in the selected network. For example, the nodes tab 1652 includes a plurality of drop down menus from making selections in each of the form fields. The options in the drop down menus are limited to include only valid selections for the network topology and available resources. The options may also include a default setting that appears in the form prior to selection by the user. The nodes tab 1652 includes two end node forms 1680 and 1684. The end node forms 1680 and 1684 allow the user to select the nodes where the circuit will enter and leave the subrate network through the trib ports. The end node forms 1680 and 1684 provide drop down choices corresponding to the ADM nodes in the subrate network. The nodes tab 1652 includes two trib protection forms 1682 and 1686 corresponding to the end node forms. The trib protection forms 1682 and 1686 allow the user to select tributary protection schemes for each of the end nodes. The trib protection forms 1682 and 1686 provide drop down choices corresponding to the types of tributary protection (e.g., unprotected, tributary 1+1, or optical splitter) available for the network. The nodes tab 1652 includes a service capacity form 1688. The service capacity form 1688 allows the user to select the service capacity for the circuit being created. The service capacity form 1688 provides drop down choices corresponding to the range of capacities available for the subrate network (e.g., 1 STS-1, 3 STS-1, 12 STS-1, etc.). The nodes tab 1652 includes a line protection form 1690. The line protection form 1690 allows the user to specify the type of line protection to be used in provisioning the circuit between nodes in the subrate network. The line protection form 1690 provides drop down choices corresponding to the possible line protection schemes corresponding to the subrate network topology (e.g., unprotected or bi-directional/SUPSR for a ring topology). Selection of the next button 1660 registers the selections currently displayed in the forms, initiated processing to determine available ports in the selected end nodes, and advances the interface to the ports tab 1654.

The ports tab 1654 provides an interface for reviewing the selections made on the nodes tab 1652 and selecting tributary ports and line channels for the desired service. The ports tab 1654 includes displays for the selection made on the ports tab 1654. The displays corresponding to the selections made include end node displays 1710 and 1722, tributary protection displays 1712 and 1724, line protection display 1730, and service capacity display 1732. The ports tab 1654 also includes forms for selecting working tributary ports for each of the end nodes and a working line port for use between nodes. The ports tab 1654 includes tributary port forms 1716 and 1726. The tributary port forms 1716 and 1726 are limited to the tributary ports presently available in the nodes selected from the nodes tab 1652. If a form of tributary protection was selected from the nodes tab 1652, then protection ports for handling the protection will be selected and displayed. For example, the ports tab includes two protection port displays 1718 and 1728 corresponding to the 1+1 protection scheme selected from the nodes tab 1652. In an alternate embodiment, the user may select protection ports in a manner similar to the selection of working ports. The ports tab 1654 includes a line port form 1720. The line port form 1720 allows a user to select a line port where multiple line ports exist for traversing between nodes. Typically, this involves selecting the east or west line port of the node for the working line. The ports tab 1654 also allows the user to specify a name for managing the circuit that is being created. The ports tab 1654 includes a circuit name form 1734. The circuit name form provides an open field for entering a desired name. Selection of the next button 1660 registers the selections currently displayed on the ports tab 1654 and advances the interface to the review tab 1656.

The review tab 1656 provides an interface for reviewing previously entered information. The review tab 1656 includes a number of displays for the selections made from the nodes tab 1652 and the ports tab 1654. The displays corresponding to the selections made include end node displays 1810 and 1820, tributary protection displays 1812 and 1822, working port displays 1814 and 1824, protection port displays 1816 and 1826, line port display 1818, line protection display 1828, service capacity display 1830, and circuit name display 1832. The review tab also provides a selection scheme display 1834 for the method being used to select timeslots and assign cross-connects. In the example shown, the selection scheme is automatically assigned according to default selection scheme and an appropriate message is provided in the selection scheme display 1834. If the user uses the timeslot modification interface (by selecting the timeslot modification button 1668), the user manually selects or alters the selections and an appropriate message (e.g., "manual") is displayed in the selection scheme display 1834. When the provision button 1664 is selected, the process of provisioning the circuit is initiated and the interface is advanced to the results tab.

In an alternate embodiment (not shown), the review tab 1656 includes a selection scheme form, rather than a selection scheme display. The selection scheme form allows the user to choose from a plurality of selection schemes that will be used by the subrate service management module to select timeslots and assign cross-connects. Examples of alternate selection schemes include: top down, bottom up, smallest block, or uniform timeslots across nodes. In the alternative, the selection scheme form may be provided on one of the other tabs or through another interface.

The results tab 1658 provides an interface for the results of the selection and provisioning of cross-connects. Like the review tab, the results tab 1658 includes a number of displays for the selections made from the nodes tab 1652 and the ports tab 1654. The displays corresponding to the selections made include end node displays 1910 and 1920, tributary protection displays 1912 and 1922, working port displays 1914 and 1924, protection port displays 1916 and 1926, a line port display 1918, a line protection display 1928, a service capacity display 1930, and a circuit name display 1932. The results tab 1658 also includes a cross-connect display 1934 that provides the results of the selection of timeslots and assignment of cross-connects. The cross-connect display 1934 identifies each cross-connect in the circuit, detailing the timeslots being used. The cross-connect display 1934 shown is a table with row entries for each node and each path within each node. For example, where the selected circuit has an STS-3 capacity, three cross-connects through each node would be shown. The cross-connect display 1934 also includes a plurality of columns with information corresponding to each path through each node. For each path in each node, the columns display the cross-connect type (e.g., add/drop, pass through, or hairpin), the node name, the entry path, the exit path, and any protection scheme (the columns for exit path and protection scheme are not shown). The entry and exit paths may identify the shelf, channel, and port of the subrate timeslot being used. In an alternate embodiment, the entry and exit paths may identify the subrate timeslots themselves. When the provision another button 1670 is selected, the session for provisioning the current circuit is closed, the interface is directed to the nodes tab 1652, and a session for definition and provisioning of a new circuit is initiated.

FIG. 20 shows an interface 2000 for displaying the used and available time timeslots in a selected channel through the nodes of a subrate network. The interface 2000 may be invoked from an interface for selecting and provisioning subrate services as described above. The interface 2000 may also be accessed directly from other portions of an element management system. The interface 2000 includes a window 2002 with a title bar 2004, a close button 2006, an OK button 2008, a report button 2010, an export button 2012, a subrate timeslot map 2020, and a legend 2060. Both the close button 2006 and the OK button 2008 allow the user to terminate the interface 2000 and return to the portion of the element management system from which they invoked the interface. The report button 2010 and the export button 2012 allow the user to capture and send the data to another resource, such as a printer or a storage device. However, these features allow the user to provide a copy of the available timeslots for reference when selecting channels or manually selecting subrate timeslots. The subrate timeslot map 2020 provides a display for summarizing current timeslot usage and identifying available timeslots. The subrate timeslot map 2020 is generated based upon data from storage, such as subrate topology storage, subrate node storage, and subrate circuit storage.

The subrate timeslot map 2020 is arranged as a table. Node columns 2030, 2040, and 2050 correspond to the nodes in the subrate network. Sub-columns 2032, 2034, 2042, 2044, 2052, and 2054 correspond to the entry and exit paths. The timeslot number columns 2022 and 2024 on either side of the subrate timeslot map 2020 identify the subrate timeslots within each of the paths for each of the nodes. The subrate timeslot map 2020 includes a header 2026 that includes appropriate identifiers for the node columns 2030, 2040, and 2050, the sub-columns 2032, 2034, 2042, 2044, 2052, and 2054, and the timeslot number columns 2022 and 2024. In each of the rows 2026 corresponding to the subrate timeslot numbers in the timeslot number columns 2022 and 2024, information regarding whether the timeslot is in use is displayed for each of the paths for each of the nodes. In the example shown, used time timeslots are indicated using a solid bar, as provided by the legend 2060. Time timeslots without a bar are available. The bars 2028 spanning the node columns 2030, 2040, and 2050, indicate a previously provisioned service using timeslots 46, 47, and 48 in the entry and exit paths of each of the nodes. For example, the bars 2028 may represent an STS-3 service that was provisioned in uniform subrate timeslots for ease of administration. Note that more complex paths and timeslot usage is also possible and may be represented by bars that span only a portion of a particular row. Alternate timeslot map displays include timeslot use icons or tables overlaying to a topology map, graphical representations of the nodes, or other displays.

FIG. 21 shows an interface 2100 for manually selecting or modifying the subrate timeslots for a service. The interface 2100 allows a user to view the available timeslots in a pair of ports corresponding to a selected node and path. In one embodiment, the interface 2100 includes a graphical display of used and available timeslots and allows the user to modify cross-connects using a drag and drop or point and click type interaction. The interface 2100 may be invoked from an interface for selecting and provisioning subrate services as described above. In some embodiments, the interface 2100 may also be accessed directly from other portions of an element management system. In one embodiment, a timeslot selection function is initiated when the interface 2100 is invoked and default selections for the cross-connects are initially displayed in interface 2100. In an alternate embodiment, no defaults are selected and the user must manually select each cross-connect for the circuit. In this alternative, the interface 2100 may include a display for tracking which paths and nodes have and have not been selected.

As shown, the interface 2100 includes a window 2102 with a title bar 2104. The interface 2100 also includes several function buttons 2106, 2108, 2110, 2112, and 2114, two selection forms 2120 and 2122, and an interactive display for viewing and modifying cross-connects.

The interface 2100 includes several function buttons for handling the modification of cross-connects for the selected node and path. The function buttons include a close button 2106, an OK button 2108, a create cross-connect button 2110, a delete cross-connect button 2112, and a delete all cross-connects button 2114. The close button 2106 terminates a modification session without registering any modifications made through the interactive display or using the other function buttons. The user is returned to the interface from which the modification session was invoked. The OK button 2108 terminates the modification session, registers any modifications made in the modification session, and returns the user to the interface from which the modification session was invoked. The create cross-connect button 2110 allows the user to use the interactive display to create a new cross-connect for the node and path being displayed. The delete cross-connect button 2112 allows the user to delete an existing cross-connect for the node and path being displayed. The delete all cross-connects button 2114 allows the user to delete all existing cross-connects for the node and path. In one embodiment, creation and deletion of cross-connects relates only to the new circuit being created or a selected circuit being edited. It does not impact previously provisioned circuits other than those selected. Similarly, the OK button 2108 may include logic for verifying that the correct number of cross-connects have been selected in the node and path for the circuit and may restrict completion of the session unless cross-connects meeting the circuit requirements are present.

The two selection forms 2120 and 2122 include a node selection form 2120 and a path selection form 2122. The selection forms 2120 and 2122 allow the user to navigate among the nodes and paths to be included in the circuit by entering or selecting an appropriate identifier. For example, the node selection form 2120 may include a drop down menu listing all of the nodes to be used in the circuits. Selecting another node from the menu changes the interactive display to show the timeslot and cross-connect configuration of the selected node. Similarly, the path selection form 2122 allows the user to navigate among multiple paths, such as a working path and a protection path, in circuits that include multiple paths. Other methods of navigating among nodes or paths within a circuit are also possible.

The interactive display provides a mechanism for viewing and modifying the cross-connect of a selected node and path. The interactive display indicates the available timeslots for the selected east and west line ports or trib and line ports for the node and path. The interactive display includes port identifiers 2130 and 2132 for informing the user of the ports selected. The interactive display includes listings of the existing timeslots for the selected ports. The interactive display includes timeslot columns 2140 and 2142 associated with the port identifiers 2130 and 2132. The first timeslot column 2140 includes numbers 1–12 corresponding to the subrate timeslots associated with that port. The second timeslot column 2142 includes numbers 1–48 corresponding to the subrate timeslots associated with the other selected port. Use indicators 2150 and 2152 identify timeslots that have already been provisioned as part of another service or are otherwise unavailable. Use indicator 2150 shades timeslots 10–12 in the first timeslot column 2150 to indicate that those timeslots are unavailable. Use indicator 2152 shades timeslots 46–48 in second timeslot column 2152 similarly. The interactive display also includes an indicator for displaying a currently selected cross-connect. Shaded timeslots 2160 and 2162 and a connecting line 2164 provide an example selection indicator. The shaded timeslots 2160 and 2162 identify the timeslots presently selected for the circuit. In this example, the shaded timeslots 2160 include timeslots 7–9 in the first column 2150 and the shaded timeslots 2162 include timeslots 43–45 in second column 2152. In the embodiment shown, the shaded timeslots 2160 and 2162 automatically cover a consecutive grouping of timeslots based upon the capacity of the service. In an alternate embodiment, individual timeslots are selected independently for the circuit until an appropriate number for the capacity are selected. In order to modify the selected timeslots, the user may move the shaded timeslots 2160 and 2162 to alternate positions in the columns 2150 and 2152. Modification of the selected timeslots in one node will automatically updated the selected timeslots in the adjacent nodes to maintain a legal circuit configuration.

The invention claimed is:

1. A system for managing an optical network, comprising:
   an interface module, the interface module receiving a selection describing a service through a plurality of nodes in the optical network;
   a service type input for selecting a capacity for the service; and
   a provisioning module, the provisioning module establishing cross-connects between timeslots in the plurality of nodes, the provisioned timeslots in the plurality of nodes fulfilling the service described in the selection received by the interface module;
   wherein the interface module provides an interface displaying available ports in each of the plurality of nodes in the service and receives selections defining a timeslot configuration.

2. The system of claim 1, further comprising:
   a node identification module, the node identification module determining the plurality of nodes for the service from all nodes in the optical network based upon the selection received by the interface module.

3. The system of claim 1, further comprising:
   a timeslot discovery module, the timeslot discovery module identifying available timeslots in each of the plurality of nodes for the service based upon the selection received by the interface module.

4. The system of claim 1, further comprising:
   a selection module, the selection module determining the timeslot configuration for each of the plurality of nodes in the service based upon the selection received by the interface module.

5. The system of claim 4, wherein the interface module provides an interface for reviewing the timeslot configuration and receives modifications of the timeslot configuration.

6. The system of claim 4, wherein the timeslot configuration includes identification of port timeslots associated with ports into a first end node and a second end node for the service, and the interface module provides an interface for reviewing and modifying the selection of port timeslots.

7. The system of claim 4, wherein the selection module uses a provisioning scheme for automatically determining the timeslot configuration and wherein the interface module enables modification of the provisioning scheme.

8. The system of claim 1, wherein the selection received by the interface module includes a first end node, a second end node for the service, and a service capacity.

9. The system of claim 1, wherein the selection received by the interface module includes a protection scheme for the service.

10. A method of managing an optical network, comprising:
    providing an interface for describing a desired service through a plurality of nodes in the optical network;
    receiving a selection describing the service through the interface;
    receiving a selection describing a capacity for the service; and
    provisioning cross-connects between timeslots in the plurality of nodes, the provisioned timeslots in the plurality of nodes fulfilling the service described in the selection received by the interface module;
    wherein the interface displays available ports in each of the plurality of nodes in the service and receives selections defining a timeslot configuration.

11. The method of claim 10, further comprising:
    determining the plurality of nodes for the service from all nodes in the optical network based upon the received selection.

12. The method of claim 10, further comprising:
    identifying available timeslots in each of the plurality of nodes for the service based upon the received selection.

13. The method of claim 10, further comprising:
    determining the timeslot configuration for each of the plurality of nodes in the service based upon the received selection.

14. The method of claim 10, wherein the received selection includes a first end node, a second end node for the service, and a service capacity.

15. The method of claim 10, wherein the received selection includes a protection scheme for the service.

16. A graphical interface for managing an optical network comprising:
    a first node input for selecting a first end node for a desired service, the first end node selected from among a plurality of nodes in the optical network;
    a second node input for selecting a second end node for the desired service, the second end node selected from among the plurality of nodes in the optical network;
    a service type input for selecting a capacity for the service; and
    a port allocation summary displayed after selection of the first end node, the second end node, and the capacity of the service, the port allocation summary including port and timeslot allocations for the first end node and the second end node.

17. The graphical interface of claim 16, further comprising:
    a first node protection input for selecting protection associated with a tributary connection to the first end node;

a second node protection input for selecting protection associated with a tributary connection to the second end node; and a line protection input for selecting protection associated with line connections between nodes.

18. The graphical interface of claim 16, further comprising:

a network topology display, the network topology display including identifiers for the plurality of nodes in the optical network and a representation of relative position of the plurality of nodes to one another.

19. The graphical interface of claim 16, further comprising:

a port selection input for selecting port allocations for the first end node and the second end node from a list of available ports in the first end node and the second end node.

20. The graphical interface of claim 16, further comprising:

a timeslot selection display, the timeslot selection display identifying a plurality of available timeslots for the nodes selected for the service; and a timeslot selection input for selecting desired timeslots from the plurality of available timeslots for provisioning of the service.

21. The graphical interface of claim 16, further comprising:

a cross-connect display, the cross-connect display identifying a plurality of timeslots provisioned for nodes selected for the service.

22. A system for provisioning a service in an optical network, comprising:

a node identification module, the node identification module determining a plurality of nodes to be used for the service from all nodes in the optical network;

a timeslot discovery module, the timeslot discovery module identifying available timeslots in each of a plurality of nodes to be used for the service;

a provisioning module, the provisioning module establishing cross-connects between timeslots in the plurality of nodes to provision the service; and a selection module, the selection module determining a timeslot configuration for each of the plurality of nodes to be used for the service, the timeslot configuration being used by the provisioning module to establish the cross-connects wherein the selection module uses a selected provisioning scheme in determining the timeslot configuration, the selected provisioning scheme being chosen for the service from a plurality of possible provisioning strategies.

23. The system of claim 22, wherein the node identification module accounts for a line protection scheme in the service in determining the plurality of nodes to be used for the service.

24. The system of claim 22, wherein the timeslot configuration includes timeslots associated with ports for tributary connections to a first end node and a second end node, the first end node and the second node among the plurality of nodes to be used for the service.

25. The system of claim 24, wherein the timeslot configuration includes multiple timeslots associated with the ports for tributary connections in order to account for a tributary protection scheme for the service.

26. The system of claim 22, further comprising:

an interface module, the interface module interactively receiving a selection describing the service and enabling a user to view and modify a timeslot configuration for the service.

27. A system for managing an optical network, comprising:

providing an interface for describing a desired service through a plurality of nodes in the optical network;

receiving a selection describing the service through the interface;

receiving a selection describing a capacity for the service; and provisioning cross-connects between timeslots in the plurality of nodes, the provisioned timeslots in the plurality of nodes fulfilling the service described in the selection received by the interface module;

wherein the interface displays available ports in each of the plurality of nodes in the service and receives selections defining a timeslot configuration.

28. The system of claim 27, further comprising instructions for:

determining the plurality of nodes for the service from all nodes in the optical network based upon the received selection.

29. The system of claim 27, further comprising instructions for:

detecting available timeslots in each of the plurality of nodes for the service based upon the received selection.

30. The system of claim 27, further comprising instructions for:

determining the timeslot configuration for each of the plurality of nodes in the service based upon the received selection.

31. The system of claim 27, wherein the received selection includes a first end node, a second end node for the service, and a service capacity.

32. The system of claim 27, wherein the received selection includes a protection scheme for the service.

33. A system for managing an optical network, comprising:

an interface means for receiving a selection describing a service through a plurality of nodes in the optical network;

a service input means for selectin a capacity for the service; and a provisioning means for establishing cross-connects between timeslots in the plurality of nodes, the provisioned timeslots in the plurality of nodes fulfilling the service described in the selection received by the interface means;

wherein the interface means provides an interface displaying available ports in each of the plurality of nodes in the service and receives selections defining a timeslot configuration.

34. The system of claim 33, further comprising:

a node identification means for determining the plurality of nodes for the service from all nodes in the optical network based upon the selection received by the interface means.

35. The system of claim 33, further comprising:

a timeslot discovery means for identifying available timeslots in each of the plurality of nodes for the service based upon the selection received by the interface means.

36. The system of claim 33, further comprising:

a selection means for determining the timeslot configuration for each of the plurality of nodes in the service based upon the selection received by the interface means.

* * * * *